United States Patent
Hallman, Jr.

(10) Patent No.: US 11,379,188 B2
(45) Date of Patent: Jul. 5, 2022

(54) PLUGIN-ORIENTED FUNCTIONAL PROGRAMMING SYSTEM CONFIGURED WITH SOFTWARE COMPONENTS

(71) Applicant: Foresight Data Systems LLC, Columbia, SC (US)

(72) Inventor: Ronald Dean Hallman, Jr., Columbia, SC (US)

(73) Assignee: Foresight Data Systems LLC, Columbia, SC (US)

(*) Notice: Subject to any disclaimer, the term of this patent is extended or adjusted under 35 U.S.C. 154(b) by 0 days.

(21) Appl. No.: 17/099,542

(22) Filed: Nov. 16, 2020

(65) Prior Publication Data

US 2021/0149637 A1   May 20, 2021

Related U.S. Application Data

(60) Provisional application No. 62/936,289, filed on Nov. 15, 2019.

(51) Int. Cl.
*G06F 8/10* (2018.01)
*G06F 8/20* (2018.01)
*G06F 9/445* (2018.01)

(52) U.S. Cl.
CPC .......... *G06F 8/10* (2013.01); *G06F 8/20* (2013.01); *G06F 9/44526* (2013.01)

(58) Field of Classification Search
CPC ......... G06F 8/10; G06F 10/20; G06F 9/44526
USPC ................................................. 717/104–121
See application file for complete search history.

(56) References Cited

U.S. PATENT DOCUMENTS

| | | | | |
|---|---|---|---|---|
| 5,852,733 A | * | 12/1998 | Chien .................... | G06F 8/20 712/201 |
| 5,872,973 A | * | 2/1999 | Mitchell ................ | G06F 9/465 719/330 |
| 6,226,692 B1 | * | 5/2001 | Miloushev ............ | G06F 8/36 719/316 |
| 6,543,047 B1 | * | 4/2003 | Vrhel, Jr. .............. | G06F 8/61 717/121 |
| 6,804,818 B1 | * | 10/2004 | Codella ................ | G06F 9/541 717/137 |

(Continued)

OTHER PUBLICATIONS

Caldiera et al, "Identifying and Qualifying Reusable Software Components", IEEE, pp. 61-70 (Year: 1991).*

(Continued)

*Primary Examiner* — Anil Khatri
(74) *Attorney, Agent, or Firm* — Dority & Manning, P.A.

(57) ABSTRACT

A computing system can be configured to perform operations in a define phase including receiving a component specification including a transformation function; inputting the component specification into a define function; receiving, as an output of the define function, the factory function; and receive data describing a second software component that satisfies the component specification of the first software component. In an assembly phase after the define phase, the computing system can input, into the factory function, the first software component and the second software component; and receiving, as an output of the factory function, the assembled software system including the first software component connected with the second software component according to the component specification of the first software component.

28 Claims, 11 Drawing Sheets

(56) References Cited

U.S. PATENT DOCUMENTS

| | | | |
|---|---|---|---|
| 6,854,107 B2* | 2/2005 | Green | G06F 8/20 717/117 |
| 7,073,164 B1* | 7/2006 | Knowles | G06F 8/10 717/102 |
| 7,373,635 B2* | 5/2008 | Guyette | G06F 8/20 706/45 |
| 7,685,563 B2* | 3/2010 | Kumar | G06F 9/4492 717/121 |
| 7,703,072 B2* | 4/2010 | Nakamura | G06F 11/0727 717/107 |
| 7,711,674 B2* | 5/2010 | Arthur | G06F 8/36 706/62 |
| 7,840,937 B1* | 11/2010 | Chiluvuri | G06F 8/30 717/109 |
| 8,418,126 B2* | 4/2013 | Chaar | G06Q 10/06 717/124 |
| 8,468,515 B2* | 6/2013 | Chen | G06F 8/65 713/1 |
| 8,745,583 B2* | 6/2014 | Ronen | G06F 16/90 717/125 |
| 8,843,884 B1* | 9/2014 | Koerner | G06F 8/34 717/109 |
| 9,058,177 B2* | 6/2015 | Chiluvuri | G06F 8/20 |
| 2019/0392043 A1 | 12/2019 | Wilson et al. | |

OTHER PUBLICATIONS

Ommering "Building Product Populations with Software Components", ACM, pp. 255-265 (Year: 2002).*

Neblett, "Implementing Reusable, Instrument Independent Test Programs Factor", IEEE, pp. 29-34 (Year: 1997).*

Zaremski et al, "Specification Matching of Software Components", ACM, pp. 333-369 (Year: 1997).*

Chan et al, "Creating a Distributed Factory Object Architecture", IEEE, pp. 282-290 (Year: 1997).*

Lee at al, "Facilitating Reuse of Software Components using Repository Technology", IEEE, pp. 1-7 (Year: 2003).*

Batory et al, "The Design and Implementation of Hierarchical Software Systems with Reusable Components", ACM, pp. 355-398 (Year: 1992).*

Ravichandran et al, "Software Reuse Strategies and Component Markets", ACM, pp. 109-114 (Year: 2003).*

* cited by examiner

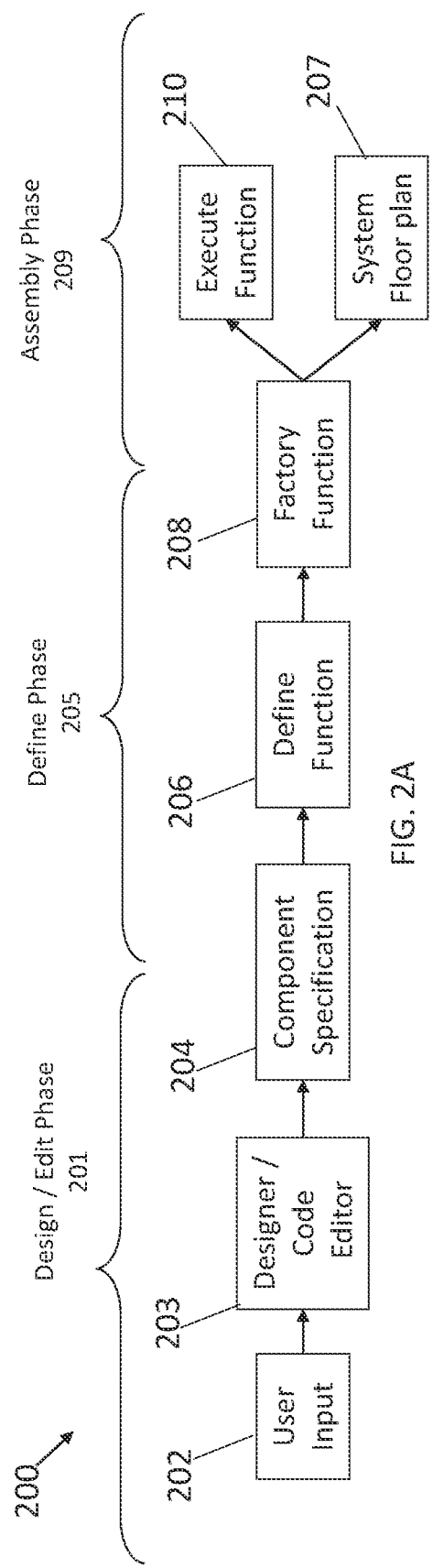
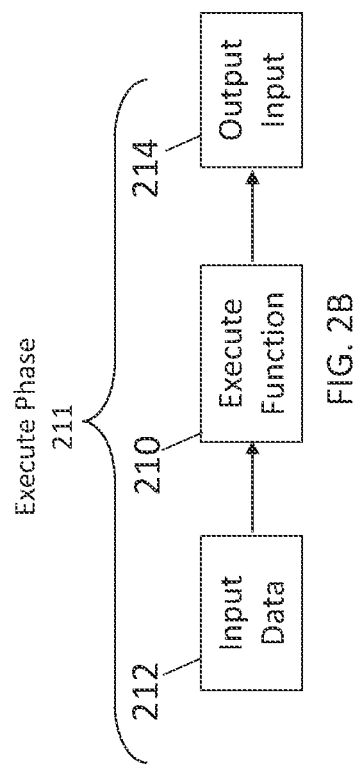
FIG. 2A
FIG. 2B

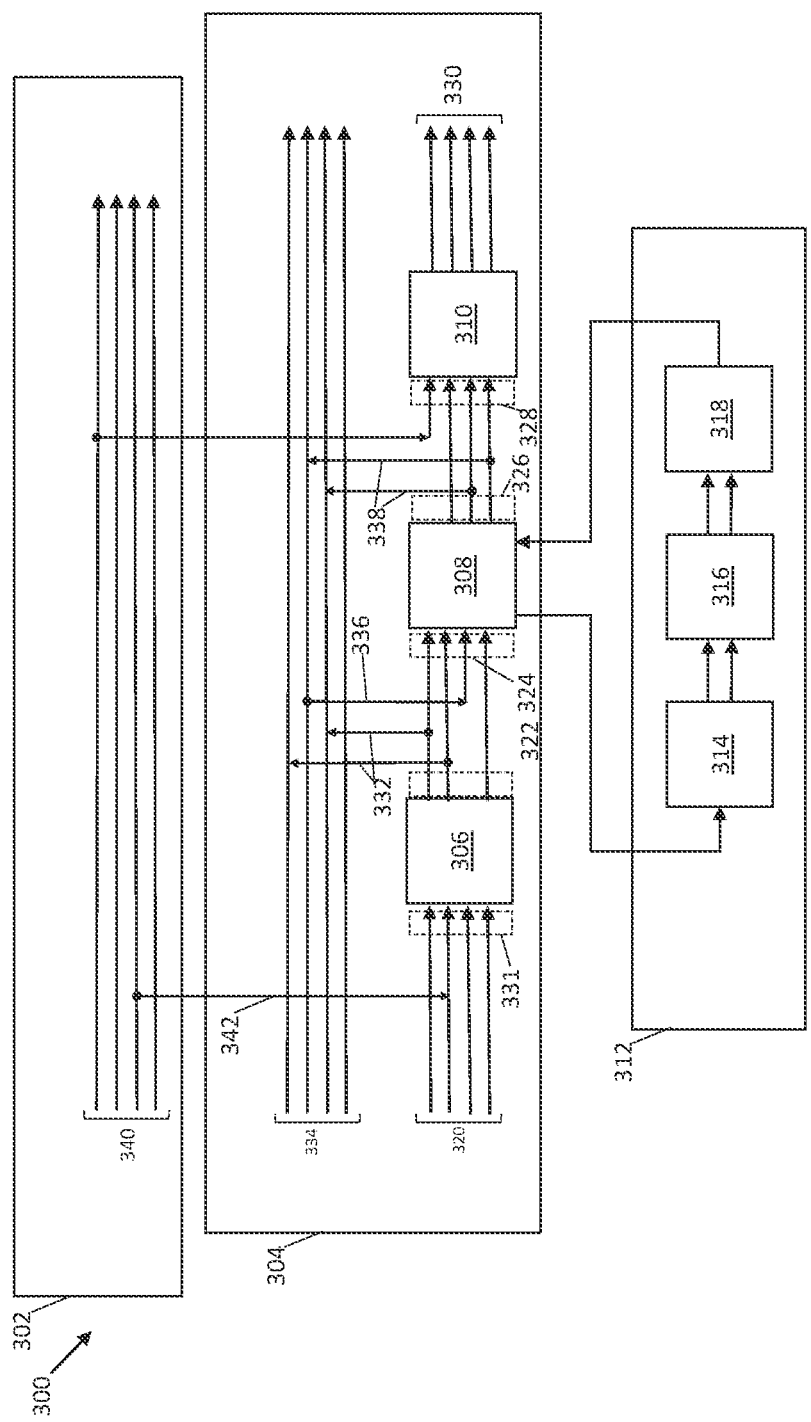

PLUGIN-ORIENTED FUNCTIONAL PROGRAMMING SYSTEM CONFIGURED WITH SOFTWARE COMPONENTS

CROSS REFERENCE TO RELATED APPLICATION

The present application claims filing benefit of U.S. Provisional Patent Application Ser. No. 62/936,289 having a filing date of Nov. 15, 2019, which is incorporated herein by reference in its entirety.

FIELD

Generally, the present disclosure is directed to computer programming systems. More particularly the present disclosure is directed to a plugin-oriented functional programming system.

BACKGROUND

Conventional functional programming systems are often ill-equipped for building highly concurrent systems involving asynchronous response and for accommodating the potential for exceptions in remote systems. Consider for example, a function chain F1(F2(F3( ))), in which a function F2( ) invokes a cloud service, which can take a long time to return. It can be wasteful of compute resource and expense for function F2( ) to block the thread of execution while waiting on the cloud to respond. However, re-assigning the thread to other tasks while in the middle of a chain of functions, to avoid leaving threads or CPU cores idle, can complicate the conventional functional programming model. For example, if an exception is thrown by the cloud service while the thread is re-assigned to other work, then F2( ) is no longer running to catch and remediate such an exception when it occurs. Given that such thread re-assignment during 10 wait states could occur many times, this complication can be profound. Resuming F2( ) after completion of the cloud service also implies its own set of complications in restoring necessary state and redirecting program execution. Moreover, the aforementioned scenarios involve a single thread of execution. Consider how these complexities can mount further when involving many threads and CPU cores, and/or when engaging thread-pooling techniques to enable serving a large number of concurrent users through a persistently stateful application flow.

Given the pervasiveness of cloud computing, multi-core CPUs, streaming big data and high user concurrency, addressing and accounting for the aforementioned complexities would provide for a substantial improvement over conventional systems. Prior art systems fail to deliver a simplifying compute model that avoids conflating or interleaving concurrency complexities with orthogonal business logic.

Historically, software developers have often turned to the practice of building abstractions in software to help manage and separate distinct concerns and complexities. However, tenets of conventional functional programming demand that functions have no side-effects outside of their own scope. Remaining side-effect free can make it harder to build simplifying abstractions using conventional functional programming systems, since non-trivial abstractions may be stateful.

Category theory and its principle construct, the Monad, entered computer science literature and practice in the 1990's, in part as a means of boosting the abstraction building capacity of functional programming, while still avoiding side-effects. Haskell's™ continuation monad and Javascript's™ Promise/A+ standard, for example, can be viewed as an attempt to directly address the asynchronous IO and exception handling difficulties in conventional functional programming as previously described. Unlike object-oriented programming, which generally builds abstractions over stationary state, monads can afford richer abstraction building in functional programming, by prescribing an approach which can build abstractions over state that is moving along a chain of functions. However, while monads may represent an advance over conventional functional programming methods, they generally come with their own set of limitations and complexities.

Monads, as currently applied in Computer Science, may introduce significant limitation and additional complexity to overcome their own one-dimensional design and approach to structure and value propagation. Software developers can be forced into abandoning Monads when complexities arise that Monads are not suited to address. To address these situations, a mixed programming model can be employed, where short, structured monadic function chains can be joined together by traditional, unstructured "glue-logic". However, Monads can be incompatible with each other, sometimes forcing transformer monads in between to compensate for such incompatibility. Further, Monads can violate the single-responsibility principle, since each monad may implement required business logic, plus orthogonal concerns involving concurrency, IO deferral, and asynchronous response. Monads do not disclose upfront structural and hierarchical knowledge of the monadic function chain before the monadic function chain is run to transform inputs to outputs. In other words, how monads are arranged or nested is not apparent until a monadic function chain is run. At that point, however, it is too late to leverage that knowledge for gains in performance, visualization, and/or automation. Furthermore, monadic functional programming can be complex and/or difficult to learn, even for advanced programmers, causing a range of challenges in hiring, training, and consensus reaching.

A distinct but related trend is the increased acceptance and availability of visual programming tools that enable "citizen developers" to build software through visual, graphical user interfaces. These "No-Code" and "Low-Code" visual programming tools can enable schematic capture of software solutions and workflows, by placing software components on a canvas and routing connections between them. Tools in this category can generate data, often in JSON™ or XML, form (or other formatting convention), that describes steps which a pre-written software application should perform. However, conventional No-code and Low-code programming tools generally cannot produce runnable source code written in a textual programming language. While conventional software development tools may allow users to construct software via a graphical or textual programming environment, conventional software development tools generally do not allow for a hybrid approach that is both textual and graphical with regards to the software being authored. An improved programming system would be welcomed in the art.

SUMMARY

Aspects and advantages of embodiments of the present disclosure will be set forth in part in the following description, or can be learned from the description, or can be learned through practice of the embodiments.

According to one aspect of the present disclosure, a computing system can be configured to perform operations in a define phase including receiving a component specification including a transformation function; inputting the component specification into a define function; receiving, as an output of the define function, the factory function; and receive data describing a second software component that satisfies the component specification of the first software component. In an assembly phase after the define phase, the computing system can input, into the factory function, the first software component and the second software component; and receiving, as an output of the factory function, the assembled software system including the first software component connected with the second software component according to the component specification of the first software component.

According to another aspect of the present disclosure, a method can include, in a define phase, receiving a component specification including a transformation function; inputting the component specification into a define function; receiving, as an output of the define function, the factory function; and receive data describing a second software component that satisfies the component specification of the first software component. In an assembly phase after the define phase, the computing system can input, into the factory function, the first software component and the second software component; and receiving, as an output of the factory function, the assembled software system including the first software component connected with the second software component according to the component specification of the first software component.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

FIG. 2A is a simplified illustration of a plugin-oriented functional programming method according to aspects of the present disclosure.

FIG. 2B is a simplified illustration of operations performed in an execute phase according to aspects of the present disclosure.

FIG. 3A is a simplified illustration of a plugin-oriented functional programming system according to aspects of the present disclosure.

Figure 1:
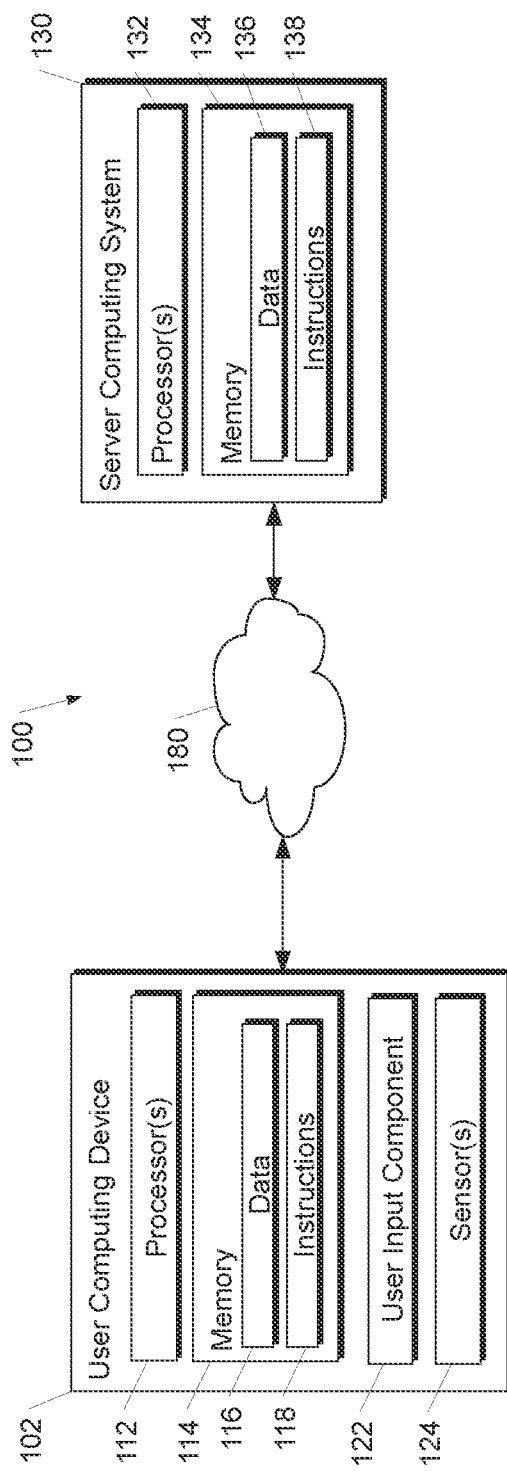
FIG. 1 is a simplified schematic diagram of a plugin-oriented functional programming system, according to aspects of the present disclosure.

Reference numerals that are repeated across plural figures are intended to identify the same features in various implementations.

DETAILED DESCRIPTION

Overview

Generally, the present disclosure is directed to a computing system for plugin-oriented functional programming. Aspects of the present disclosure may include and/or facilitate a source-code-generating schematic capture tool, wherein the source code and depicting schematic diagrams can be kept automatically synchronized after changes in either specification. The source-code-generating schematic capture tool may represent a new category of dual-mode software programming experience. Such a software development tool with dual-mode textual and graphical authorship capabilities would be welcomed in the arts since it could enable citizen and professional developers to work simultaneously on a common software system, where each developer may work in the manner and medium which they understand and prefer.

One example application of the present disclosure can simplify construction and accelerate delivery of highly concurrent, highly distributed, highly reliable software systems in source code form. Aspects of the present disclosure can incorporate a novel compute model that can combine the abstraction building capacity of object-oriented programming with the concurrency, simplicity and reliability advantages of functional programming. Plugin-oriented functional programming may enable software developers to build applications in terms of the business logic required. Technical software design concerns, such as aspects of concurrency, asynchronous cloud IO, thread re-assignment and pooling, remediation, and retry etc. can be automated, optimized, and abstracted by the programming model. Aspects of the present disclosure may achieve these goals without asking software developers to abandon or deprioritize their highly technical skillset in crafting full and open source code solutions. By introducing an open source programming model that can accomplish what conventional tools may require a closed, constrained walled-garden, or no-code developer experiences to achieve, the present disclosure may afford software developers the choice of full-disclosure and full-control over their own source code, while still pushing concurrency complexities and implementation details below their line-of-sight when implementing business logic.

Aspects of the present disclosure can also facilitate collaboration between professional developers and citizen developers. The computing system can provide a user interface suitable for citizen developers to design programs, utilities, or the like. As an example, the user interface can include or provide a visual interface for arranging flowcharts, diagrams, or other visual representations of programming elements (e.g., software components) to design a program. The computing system can compile such programming elements programs in a manner that allows professional developers to edit and/or contribute to the program(s) in a manner suitable for professional developers, for example by editing human-readable code. Thus, the system for plugin-oriented functional programming can facilitate creation and/or collaboration by different methods and/or by programmers of differing programming ability levels or expertise.

By some embodiments, the plugin-oriented functional programming system of the present disclosure can serve as a foundation and strategy for achieving the schematic capture of source code, which may be infeasible or less practical with programming systems of the current arts. Compared to conventional No-Code and Low-Code software schematic capture systems and methods, source code schematic capture, as described herein, can enable full-source-code generation, editing, illustration, and debugging through graphical depictions and drag-and-drop User Interface elements and actions. Furthermore, the source code schematic capture system of the present disclosure can synchronize updates in graphical, diagrammatic and source-code renderings of the system under construction to retain consistency and agreement across all renderings as changes are made through any single rendering and/or user interface.

In one example embodiment, the plugin-oriented functional programming system of the present disclosure may define a software component as a foundation and/or atomic construct in the system. As used herein "software component" can refer to a set of computer-readable instructions, which can be stored in non-transitory computer-readable medium. A software component can include three computational models: 1) a component model; 2) an instantiation model; and 3) an embedding model. The three computational models of the software component may be expressed fully in source code form, such as in conventional programming languages capable of returning functions as values from other functions, such as JavaScript™, Typescript™, Scala™ etc. Furthermore, the three computational models of the software component can be executed by the standard runtime environment of the programming language in which these models are expressed. As such, extraneous runtime components, environments or systems to implement these computational models or enable core functions can be avoided.

The component model may define the atomic elements of the computing system, including the software component, inputs to the software component, outputs from to the software component, connections to other software components, configured properties and expectations about a host and/or parent of a software component. The component model can be or include a set of rules which can govern what constitutes a software component, and how software components may be defined, structured and connected once are assembled. A component specification is an expression and/or description of a software component as source code (e.g., human readable code), which can be transformed into a software component, provided the component specification is compliance with the component model.

In the component model, the software component can be a single computational unit of work specification. The software component can receive a plurality of values as inputs and compute a plurality of values as outputs. The software component may codify the types of inputs the software component can expects to receive, the types of outputs the software component will return, and one or more functions which map inputs to outputs (e.g., a transform function). Furthermore, the component model of the software component may incorporate facilities for discovery and enumeration of other software components (e.g., all other software components) within a software system, including how elements are structured, nested, and/or connected.

The instantiation and component models may be related. The component model may define elements of the computing system, and the instantiation model may define how the elements change over time. The instantiation model may define a lifecycle of the elements of the computing system, such as how elements of the computing system can be created and further elaborated and/or specified over time. The software components that are defined by the component model of the software component may change over time, as they are created, assembled and executed. The computing system's instantiation model can include three successive phases: 1) define; 2) assemble; and 3) execute. The instantiation model may also be referred to as a functional composition model of the software component. Furthermore, the computing system's instantiation model may incorporate "Copy-Forward" functions and/or facilities, responsible for progressing a software system from one instantiation phase to the next successive instantiation phase in the instantiation model.

In a define phase, the computing system may declare a software component as a unit unto itself, including child software components the software components may nest within itself. The software component may be declared without specifying data about a parent software component which may eventually contain or connect with the software component. A software component may be instantiated many times and embedded within many containing software components. As such, the define phase may define traits and behaviors of the software component that are common to subsequent instances of the software component which may eventually be embedded within other software components.

In an assembly phase after the define phase of the instantiation model, the computing system may connect software component instances together with other software component instances into a network of software component instances. In the network, each software component instance may be created from or based upon the specification defined in the computing system's define phase. The input and output connections defined for all software components in the define phase can be connected together in the assembly phase, such that the defined outputs of each software component instance flows to the defined inputs of other software component instances in the network of software component instances.

While the embedding of the software component within other software components may be specified within the define phase, the actual embedding can occur within the assembly phase. Software components can be embedded in a variety of manners and/or configurations. As one example, a software component instance embedded as one computational stage, within a sequence of computations stages, also referred to as a pipeline. The entire sequence of stages can be executed in series and as a unit. As another example, a child software component embedded within a parent software component. The child software component can serve as a delegate called a yield block. The parent software component may delegate work to the child software component as the parent software component processes inputs from an input stream. As yet a further example, a software component may be embedded as one member of a collection of possibly related software component, called a plugin. The children software components can be members of a parent software component (e.g., a plugin). Each member may be addressed independently through a namespace which the plugin may implement. Each member of a plugin can be assigned a unique name within the namespace of the plugin. Furthermore, a plugin may provide its members with access to a common value space. The members of the plugin may coordinate activities through a shared state. As a further example, a plugin may be embedded within a pipeline, such that all members of the plugin may be addressable by the pipeline through the plugin's name. Furthermore, the namespace of a plugin may extend the API of the parent pipeline, such that plugin members can become stages of the containing pipeline.

In an execute phase after the assembly phase, the software component can be executed to receive input values and compute and/or return output values according to the component specification of the software component (e.g., as defined in the define phase). As software components may contain other software components, the execute phase can be similarly hierarchical to ensure that all software components comprising the hierarchy of software components are executed, such that inputs are transformed to outputs at each level of the hierarchy of software components.

The computing system of the present disclosure may be configured to complete the execution of a software component before beginning to execute another software component which may depend upon one or more of its outputs. To ensure execution has been completed for a software component, the computing system may require implementing a synchronizing enclosure. The synchronizing enclosure can govern and bookend the operation of a software component. The synchronizing enclosure can ensure that CPU threads initiated by the software component have completed and yielded return values, and/or that asynchronous operations initiated by the software component have responded before initiating a subsequent software component. In some embodiments, the computing system may implement this synchronizing enclosure using a Promise abstraction or Continuation Monad to wrap each function and/or monad with the abstraction as the computing system executes the software components.

In the execute phase, the computing system may resolve references that were created in earlier phases of the instantiation model. Because the computing system may configure a Copy-Forward function to progress the computing system from earlier instantiation phases to later instantiation phases, a child or member that may be embedded within a pipeline or plugin may be re-created and copied from earlier instantiations as the computing system progresses forward through time, through instantiation phases, and/or through stages within a pipeline's execution. Copying the hierarchy and network of software components forward through the instantiate phases and/or through the stages of a pipeline's execution may preserve side-effect freedom and/or functional purity. By one example embodiment, a computing system of the present disclosure may achieve a cross-instantiation-phase and cross-pipeline-stage resolution of software components following a Copy-Forward operation, through named and/or numbered identifiers, which may remain constant through all phases and stages of the computing system.

The computing system of the present disclosure can achieve functional composition using a combination of arrayed-compose of the form F1(F2(F3( ))) and dot-chaining (e.g., "fluent API" of the form Obj.F1( ).F2( ).F3( )), thereby leveraging the strengths of each. Functional nesting and dot-chaining for achieving functional composition may each have their own trade-offs. For example, the arrayed-compose method of functional composition can allow for bifurcated runtimes, wherein the array of functions can be composed first and only, and then executed at a later time. In contrast, the dot-chaining method of functional composition generally does not provide runtime bifurcation. Rather, the function is called on the object immediately, and functions are composed and executed simultaneously. Despite this deficiency in the dot-chaining approach to functional composition, monads may still elect to use this method for its advantages. Dot-chaining may permit functions being composed by this method to access internal state and member functions of the object to which they are dot-chained. Consequently, monads may be able to leverage object access for abstraction building purposes beyond what may be feasible with the arrayed-compose method of functional composition.

In some embodiments, the computing system of the present disclosure can define a hybrid functional composition model which may combine dot-chaining and arrayed-compose in a manner that leverages the strengths of both, while avoiding their weaknesses. By this hybrid method of functional composition, the define phase may specify a dot-chain, the assembly phase may execute the dot-chain to produce an arrayed-compose, plus meta-data which describes the arrayed-compose, and the execute phase may execute the arrayed-compose to receive input data and compute output data.

The hybrid functional composition model of the present disclosure may include a dot-chain in the assembly phase and an arrayed-compose in the execute phase for example as described below with reference to FIG. 5B. The pipeline methods M1 through M5 are dot-chain methods, which may execute during the assembly phase, producing the array of functions F1 through F5 as input to the arrayed-compose, which may implement the execute function of the execute phase. The hybrid form of functional composition illustrated in FIG. 5B and disclosed herein may enable richer forms of software abstraction, automation, and optimization as compared to conventional functional programming techniques and systems. Using such hybrid and bifurcated functional compositional runtimes, the computing system can open a programmable gap between the dot-chain and arrayed-compose sub-systems, which may create opportunity to wedge in powerful constructs, algorithms, and abstractions exceeding what is feasible using current functional composition models.

By one example embodiment of the present disclosure, the pipeline construct can separate business domain logic from orthogonal scaling complexities, such as how asynchronous responses are awaited from cloud computing systems, or how secret configuration values are decrypted. Whereas current techniques may conflate or interleave these two concerns within the same source code, the pipeline construct described herein can provide separation of concerns and enable a generalized solution to complexities not previously generalizable. Thus, aspects of the disclosed technology provide benefits for orthogonal coding challenges, wherein vendor-specific, technically complex concerns can be factored out of pipelines focused on codifying business logic.

The plugin, as defined in the computing system of the present disclosure, may differ from objects in conventional object-oriented programming systems. Whereas conventional object state may remain in a fixed or relatively stationary location, state associated with a plugin may be constantly moving through a sequence of pipeline stages. Plugins may retain a seemingly stateful usage model by propagating a plugin's associated state through the computational stages of its containing pipeline or software component. The plugin's state is generally not modified in situ. Rather, a copy of the plugin's state is modified as it is propagated to the next computational stage in a sequence of computational stages. As examples of the plugin propagating state information, a plugin may retain state describing pairs of keys and values, state machines that are moved between states by the plugin's API, and/or a database cursor as rows in a table are paginated through a database plugin.

Composite software components of the computing system of the present disclosure, including pipelines and plugins may require additional methods for connecting the software components they contain. In many cases, flowing outputs of a previous software component to the inputs of a next software component is sufficient. But a sequence of software components that can only connect outputs to inputs in this manner, may soon encounter circumstances where an output known early in the sequence is hidden to software components later in the sequence. For example, if a software component in the middle of the sequence receives the value as an input but does not return the value as an output, then subsequent stages in the sequence will not receive the output value. One example embodiment of the present disclosure includes a software component called a register, which may allow a parent software component to exercise more flexibility in how it connects its children. In the previous scenario of a sequence of stages contained within a parent pipeline, the parent pipeline may define one or more registers. When a stage later in the sequence of stages requires an output which an intermediate stage has excluded, the register may allow that output value to be saved early and recalled late in the sequence of stages.

Composite software components of the present disclosure may define registers for use cases beyond bridging output values over intermediate pipeline stages. The computing system can define registers as key/value pairs, with a resolution algorithm that may visit many key/value stores as it seeks to map the key to a value. By one example embodiment of the present disclosure, a register resolution algorithm may search up the parent-child hierarchy of software components, visit local and remote key/value stores, and/or offer automatic decryption of the register values requested.

Aspects of the present disclosure can provide for integrated troubleshooting and/or automatic repair functions during the execute phase. As one example, the computing system can determine that an exception has occurred while executing a respective stage within a sequence of pipeline stages. In response to determining that the exception has occurred, the computing system can repair the underlying condition which caused the failing stage to abort processing. In some embodiments, in response to determining that the exception has occurred, the computing system can input data describing the exception into a recourse pipeline that is configured to receive the data describing the exception. The recourse pipeline can diagnose the error condition described and repair and/or remediate the underlying cause. Depending upon diagnostic and remediation outcomes, the recourse pipeline may restart the pipeline or software component, continue to a next step (e.g., next iteration, next computational stage, or the like), and/or abort the current pipeline stage or iterations. Unrecognized exceptions and/or failure to repair may also escalate the exception to a higher-level recourse pipeline in a parent software component of the current software component, where greater scope may afford a broader range of remediation options. A recourse can also employ multiple strategies, wherein the recourse may apply an initial repair and then retry the pipeline or pipeline stage that failed. If the same error recurs, the recourse may resume after the initial repair attempt, trying alternative strategies until a successful remediation strategy is identified by the recourse. Thus, aspects of the disclosed technology provide benefits for self-diagnosing and self-healing systems.

Systems and methods according to the present disclosure can provide a variety of technical effects and benefits. For example, inputting a component specification into a define function and receiving, as an output of the define function, a factory function that is configured to output an assembled software system can provide great benefits in the operation of a computer configured to generate computer programs. Aspects of the present disclosure, including the factory function, can separate business domain logic from orthogonal scaling complexities, thereby providing improved scalability and efficiency when generating computer systems. Whereas current techniques may conflate or interleave business domain logic and orthogonal scaling complexities within the same source code, the systems described herein can provide separation of concerns and enable a generalized solution to complexities not previously generalizable. Thus, aspects of the disclosed technology provide benefits for orthogonal coding challenges, wherein vendor-specific, technically complex concerns can be factored out of pipelines focused on codifying business logic.

Example Embodiments

FIG. 1 depicts a block diagram of a plugin-oriented functional programming computing system 100 according to example embodiments of the present disclosure. The system 100 can include a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations. Electronic items and/or data describing electronic items can be stored in one more local memory locations of the user computing device 102. For example, the local memory location can correspond with the memory 114.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication. The user computing device 102 can also include one or more sensors 124, such as microphones, cameras, temperature sensors, accelerometers, and the like.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A is a simplified illustration of a plugin-oriented functional programming method 200 according to aspects of the present disclosure. The method 200 is described below with reference to the computing system 100 of FIG. 1. However, the method 200 can be performed with any suitable computing devices and systems that are known in the art. The computing system 100 can receive a user input 102 from a user, such as a citizen programmer and/or program developer. The computing system 100 can receive the user input via the user input component 122. The computing system 100 can provide a user interface suitable for citizen developers to design programs, utilities or the like, such as a visual interface for arranging flowcharts, diagrams, or other visual representations of programming elements to create a program. The computing system 100 can compile such programs in a manner that allows professional developers to edit and/or contribute to the program(s) in a manner suitable for professional developers, for example by editing human-readable code. Thus, the system 100 for plugin-oriented functional programming can facilitate creation and/or collaboration by different methods and/ or by programmers of differing programming ability levels or expertise.

In a design phase 201, a diagram designer or source code editor 203 can receive data describing a user input 202 (e.g., a design input), and in response to receiving the user input 202, generate a component specification 204. For example, in the design phase 201, the user can provide design input which can include, as examples, interacting with visual elements (e.g., a flowchart) depicting a program structure (e.g., functional blocks, decision blocks, connections, etc.) to provide the user input 202. The user can arrange, modify, etc. the visual elements to design a program, utility, or the like. The component specification 204 generated by the diagram designer or source code editor 203 corresponds with the program designed by the user. In some embodiments, the component specification 204 can include a dot-chain a series of operations or functions (e.g., as described by the user input 202). However, in other embodiments, the component specification 204 can employ other methods of functional composition, such as a "compose on compose" API, or a generator-based functional composition, which can be referred to as a "generator on compose" API.

In a define phase 205, after the design phase 201, the computing system 100 can input the component specification 204 into a define function 206, and in response to receiving the component specification 204, generate a factory function 208, which can correspond with a program created or modified by the user (e.g., in a visual programming interface).

In an assembly phase 209 after the define phase, the computing system 100 can input the component specification 204 and data describing how the component specification 204 may connect with other components within a system of which the component specification 204 is a part into a factory function 208, and in response to receiving the component specification 204 and data describing connections made with the component specification 204, generate an execute function 210 and a system floor plan 211. The execute function 210 can correspond with the program designed by the user. Thus, the computing system 100 can leverage a diagram designer or source code editor 203, a component specification 204, a define function 206 and a factory function 208 to generate the execute function 210, which can correspond with computational requirements of the program created or modified by the user (e.g., in a visual programming interface) and the system floor plan 211, which can correspond with the structural design and dependency requirements of the program created or modified by the user.

The system 100 can leverage software components in a manner that facilitates generation of the execute function 210. As used herein, "software component" can refer to the component specification 204 in conjunction with the define function 206, the factory function 208, the execution function 210 and the system floor plan 211, for example as described below with reference to Figures. The define function 206 can operate in the define phase, the factory function 208 can operate in the assembly phase 209, and the execute function 210 can operate in an execute phase 211 (FIG. 2B). The system floor plan 207 corresponds to data that describes the structure and dependencies expressed within the execute function 210 and is available in the assembly phase 209 as an output of the factory function 208. Thus, the computing system can trifurcate the single runtime of current monadic systems into a define phase, an assembly phase 209 and the execute phase 211, which can be invoked independently of each other. In other words, the component specification 204 can describe computing system, which can describe itself upon request and before it is executed, by first defining the computing system in a define phase by the define function 206, and then assembling the computing system in connection with other computing systems in an assembly phase 209 by the factory function 208, and receiving as an output of the factory function 208, a system floor plan 211 that describes the computing system specified by and corresponding with the component specification 204. Finally, the computing system can be executed in the execute phase 211 by the execute function 210.

FIG. 2B is a simplified illustration of operations performed in the execute phase 211 according to aspects of the present disclosure. The computing system can execute or run the function 210 that was generated by the factory function 208. In other words, the execute function 210 can be used to perform operations described by user input 202 and/or design input of the user. For example, input data 212 can be provided to the execute function 210. The user input 202 can include any suitable inputs, such as inputs that the function was designed to process by the user during the define phase. The computing system can receive output data 214 from the execute function 210. The output data 214 can include any suitable output, such as numbers, strings, image, sound, video or the like (e.g., as designed by the user and described by the design input in the define phase).

FIG. 3A is a simplified schematic illustration of a system 300 according to aspects of the present disclosure. The system 300 can include nested software components in parent-child relationships. A grand-parent software component 302 can have a parent relationship with a parent software component 304. The parent software component 304 can have a parent relationship with a first child software component 306, a second child software component 308, and a third child software component 310. One or more of the child software components 306, 308, 310 can include a yield pipeline 312, including one or more grand-child software components 314, 316, 318. Inputs 320 can be input into the first child software component 306, and outputs 322 can be received from the first child software component 306. Inputs 324 can be input into the second child software component 308, and outputs 326 can be received from the second child component 308. Inputs 328 can be input into the third child software component 310, and outputs 330 can be received from the third child component 310.

The child components 306, 308, 310 can store and/or retrieve values with a register 334 of the parent software component 304. For example, the first child software component 306 can store one or more values 332 with the register 334 of the parent 304. The system 300 can retrieve one or more values 334 from the register 334, as indicated by line 336. Such values can be included in the inputs 324 to the second software component 308. Similarly, the system can store one or more outputs 326 of the second software component 308 in the register 334, as indicated by lines 338.

The grand-parent software component 302 can also include a register 340. The child software components of the parent software component 304 can store and/or retrieve values using the register 340 of the grand-parent software component 302. For example, one or more inputs 320 to the first software component 306 can be retrieved from the register 340, as indicated by line 342. One or more inputs 328 to the third software component 310 can be retrieved from the register 340 of the grand-parent software component 302. Thus, the parent software component 304 and/or grand-parent software component 302 can include registers 334, 340. The registers 334, 340 can facilitate asynchronous storage and/or retrieval of values across different parent-child levels of the system 300.

Figure 3B:
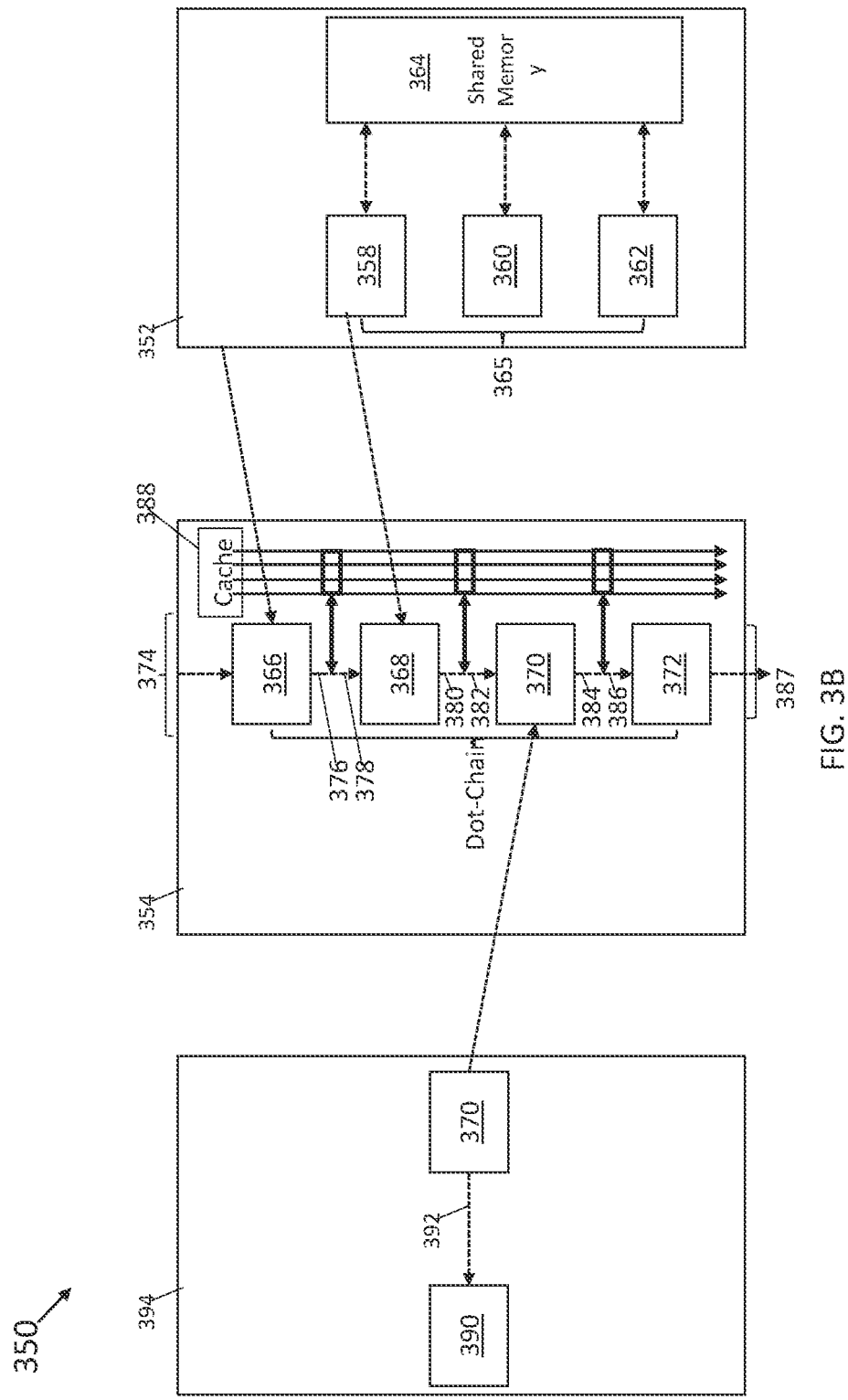
FIG. 3B is a simplified illustration of a plugin-oriented functional programming system according to aspects of the present disclosure.

FIG. 3B is a simplified schematic illustration of a system 350 according to aspects of the present disclosure. For example, the system 350 can include a namespace component 352, and a pipeline component 354. The namespace component 352 can include multiple namespace software components 358, 360, 362 having a namespace-member relationship with the namespace component 352. One or more of the software components 358, 360, 362 can store and/or retrieve data (e.g., inputs, outputs, etc.) using a shared memory 364 of the namespace component 352. A namespace API 365 can be or include the namespace software components 358, 360, 362 of the namespace component 352. The namespace API 365 can abstract and simplify access to external services, using shared memory 364 to contextualize or coordinate activities across multiple namespace API members.

The pipeline component 354 can include multiple software components 366, 368, 370, 372 included (e.g., embedded) within the pipeline component 354. A first software of the multiple software components 366, 368, 370, 372 can receive inputs 374 and produce outputs 376; a second software component 368 can receive inputs 378 and produce outputs 380; a third software component 370 can receive inputs 382 and produce outputs 384; and a fourth software component 372 can receive inputs 386 and produce outputs 387. One or more of the outputs 376, 380, 384, or components thereof, can be stored in a register 388 of the pipeline component 354. Similarly, one or more inputs 378, 382, 386, or components thereof, can be retrieved from the register 388.

One or more of the software components 366, 368, 370, 372 can include or embed a child software component 390, illustrated by arrow 392 and yield block 394. During execution, the system 350 can complete computations and/or operations of the child software component 390 before executing the parent software component (the third software component 370 in this example) that includes the child software component 390

Figure 4A:
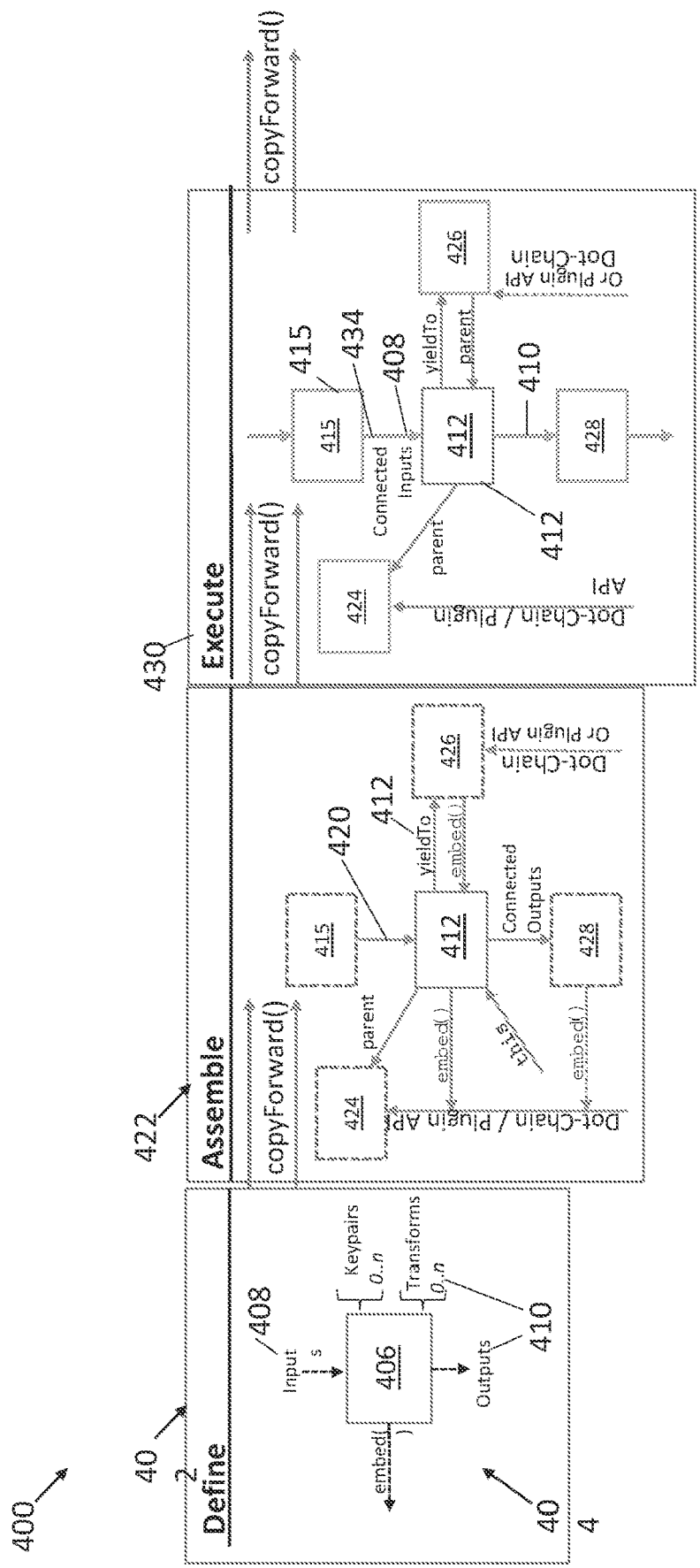
FIG. 4A is a simplified schematic of a plugin-oriented functional programming system according to aspects of the present disclosure.
Figure 4B:
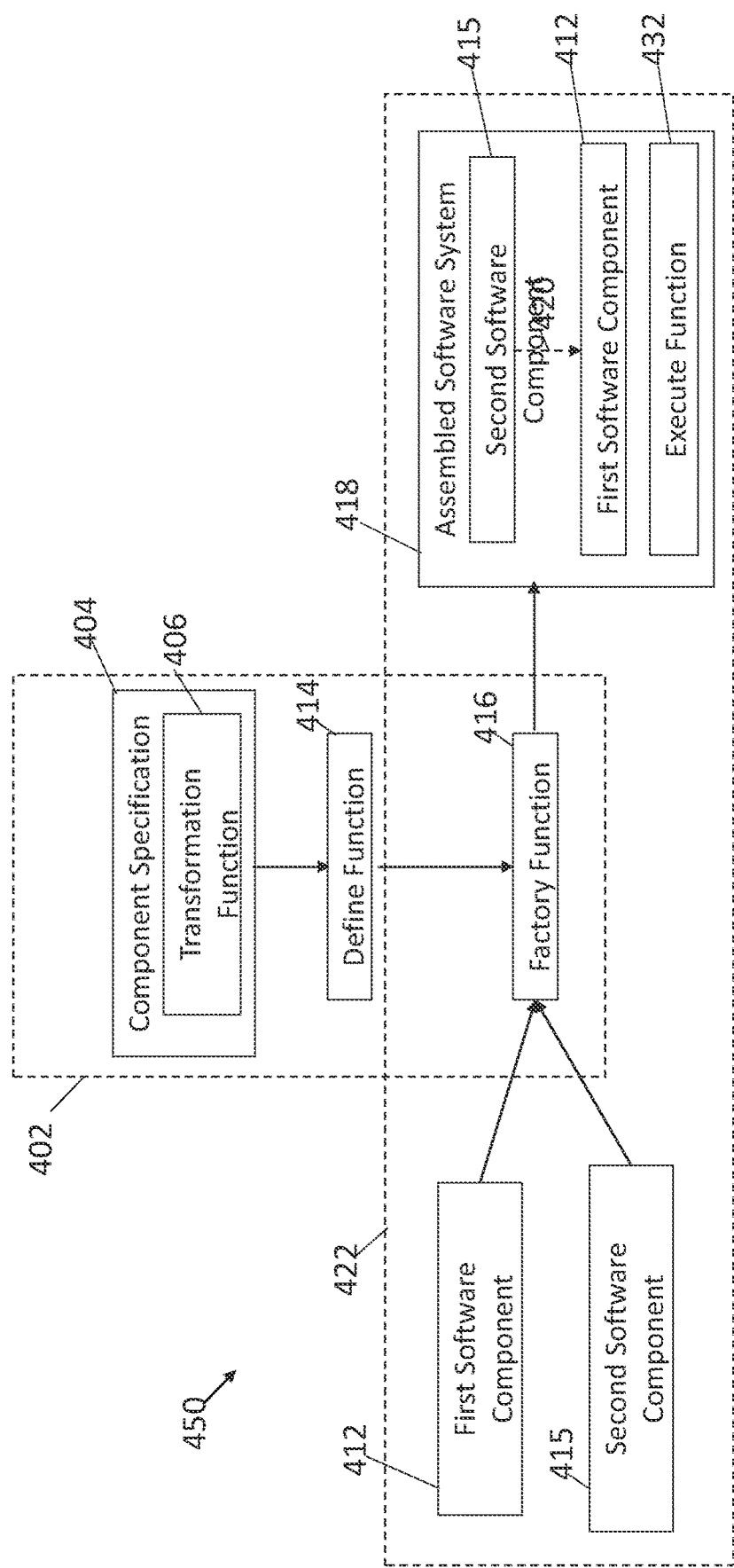
FIG. 4B is a simplified flowchart schematic of a method that can be performed by the system of FIG. 4A.

FIG. 4A illustrates an example system 400 according to aspects of the present disclosure. In a define phase 402, the system 400 can receiving a component specification 404. FIG. 4B is a simplified flowchart schematic of a method 450 that can be performed by the system 400 of FIG. 4A. Referring to FIGS. 4A and 4B, the component specification 404 can include or describe a transformation function 406 configured to receive a plurality of input values 408 and return a plurality of output values 410 for a first software component 412.

The system 400 can input the component specification 404 into a define function 414 configured to receive the component specification 404, and in response to receiving the component specification 404, generate a factory function 416. The system 400 can receiving the factory function 416 as an output of the define function 414. The factory function can be configured to receive data describing a second software component 415 that satisfies the component specification 404 of the first software component 412. For example, the second software component 415 can satisfy one or more requirements with respect to inputs (e.g., number, type, format, etc.) or outputs (e.g., number, type, format, etc.) of the first software component 412. As further examples, the second software component 415 can satisfy one or more additional requirements, such as a yield block which the first software component 412 invokes multiple times for each item within a sequence of items, or as a member component of a parent namespace (e.g. plugin).

In response to receiving the data describing the first software component 412 and the second software component 415, the factory function 416 can be configured to output an assembled software system 418 comprising the first software component connected by connection 420 with the second software component 415 according to the component specification 404 of the first software component 412. In an assembly phase 422 after the define phase 402, the system 400 can input the first software component 412 and the second software component 415 into the factory function 416 and receive, as an output of the factory function 416, the assembled software system 418 including the first software component 412 connected with the second software component 415 according to the component specification 404 of the first software component 412.

The assembled software system 418 can include data describing the first software component 412, such as input requirements, output requirements, and/or other connectivity requirements of the first software component 412. The data describing the first software component 412 can include information about how the first software component 412 is connected to the second software component 415 and/or information describing a group of plugins the first software component 412 depends on and/or imports within a nested sequence of stages.

The assembled software system 418 can include data describing the second software component 415, such as input requirements, output requirements, and/or other connectivity requirements of the second software component 415. The data describing the first software component 412 can include a type or types of iteration (e.g. map, filter, reduce) that the second software component 415 supports as a yield block, and/or information about a cloud provider or other service that the second software component 415 provides access to as a plugin.

The assembled software system 418 can include data describing the connection 420 between the first software component 412 and the second software component 415. For example, the data describing the connection 420 between the first software component 412 can be or include peer-level connections and parent-child connections. For example, as a parent-child type connection, the connection 420 could connect one stage within a parent pipeline to a child pipeline comprising a nested sequence of stages. As a peer-level (e.g. wiring diagram) connection, the connection 420 could also connect a register defined within a pipeline, to a child or yield block nested within that pipeline.

FIG. 4A illustrates the assembly phase 422 as the first software component 412 connected with the second software component 415 (illustrated by line 422) according to the component specification 404 of the first software component 412. In this example illustration, the first software component 412 can be connected with one or more additional software components 424, 426, 428, for example as described below. However, in some embodiments, the first software component 412 can be connected only with the second software component 415. In other words, the first software component 412 can be free of connections other than the connection(s) 420 with the second software component 415.

The assembled software system 418 can include an execute function 432 that is configured to execute assembled software system 418 in an execute phase 430 (FIG. 4A) after the assembly phase 422. For example, the execute function 432 can be configured to receive the input values 408 and process the input values 408 according to the transformation function 406 (as defined in the define phase 402) of the first software component 412. After computational activities associated with execution of the first software component 412 have been completed, the execute function 432 can receive the output values 410 as an output of the execution function 432. Thus, the assembled software system 418 can be executed to process data (e.g., the input values 408).

The system 400 can be used to generate assembled software systems 418 including a variety of types of software components that can be connected and/or embedded with each other in a variety of ways. Further, the system 400 can perform the above described operations in a modular manner across a variety of embedding levels of software components and/or with a variety of types of software components and/or connections therebetween.

As one example of the types of connections and/or relationships between the software components, in some embodiments, the connection 420 between the first software component 412 and the second software component 415 can be or include series-type connection. The first software component 412 can be connected in series with the second software component 415. For example, an input 408 to the first software component 412 can be defined (e.g., by the component specification 404 of the first software component 412 and/or the component specification of the second software component 415) to be or include an output from the second software component 415.

As another example, one software component may be defined as a parent to another software component, which can be defined as a child in a parent-child type relationship. For example, a third software component 424 can have a parent-child relationship with the first software component 412 and/or the second software component 415. The third software component 424 can include a component specification including data describing an embedding of one or both of the first software component 412 and the second software component 415 within the third software component 415 as children of the third software component 424. In an example in which both the first software component 412 and the second software component 415 are embedded within the third software component 424, the component specification can include data describing a relative connection order of the first software component 412 and the second software component 415. In such an example embodiment, in the assembly phase 422, the system 400 (e.g., the factory function 416) can map a plurality of output values 434 received from the second software component 415 to the plurality of input values 408 expected and/or received by the first software component 412 according to the component specification of the third software component 424, which can be defined in the define phase 402.

The system can accommodate and/or account for parent-child relationships during one or more of the phases 402, 422, 430. For example, in the define phase 402, the define function 414 can be configured to map at least one input requirement of the parent component as described by the component specification of the parent component to child component as described by the component specification of the child component. For instance, the parent component can require input values in a particular data format, from a particular type of software component or service, and/or may have other input requirements from the child component. For example, the child component may be or include a yield block that processes a single item from a sequence of items. The parent component may be responsible for choosing which sequence to iterate and mapping each item within the sequence of items to multiple calls of the child block, specifying one item per invocation. In the assembly phase, the factory function 416 can be configured to assemble the child component during assembly of the parent component. The factory function 416 can embed the child component within the parent component in the assembled software system. In the execute phase, the execute function can be configured to execute the child component when executing the parent component.

Another example type of connection between components is a namespace-member type connection. For example, the component specification 404 of the first software component 412 can describe a namespace-member type connection with the second software component 415 such that the first software component 412 is configured to embed the second software component 415 (e.g., within the first software component 412), The component specification 404 of the first software component 412 can describe a namespace. The second software component 415 can be accessible via the namespace of the first software component 412. In the assembly phase 422, the factory function 416 can be configured to assemble the second software component 415 when assembling the first software component 412. The factory function 416 can be configured to embed the second software component 415 within the first software component 412. The factory function 416 can assign the second software component 415 a unique name identifying the second software component 415 within the namespace described by the component specification of the first software component 412. For example, a command can invoke the second software component can be required to include the namespace and the unique name of the second software component, such as "[namespace].[unique name of the second software component]." A namespace for AWS' file storage service S3, for example, could be invoked as "s3.listFiles", where "s3" is the namespace and "listFiles" is the member. Furthermore, the statement "s3.listFiles" is part of a component specification 404 that, when assembled, causes a single stage generated by "s3.listFiles" to be embedded within a pipeline comprising a sequence of stages.

The namespace-member type connection can provide independent access to the members of the namespace. For example, a namespace can include multiple members. A particular member can be invoked and/or executed without executing each member of the namespace. For example, referring to FIG. 4A, in one example embodiment, the third software component 424 can have a namespace-member connection with each of the first software component 412, second software component 415, and an additional software component 428. The first software component 412, second software component 415, and the additional software component 428 can be embedded within the first software component 412. In the execute phase 430, the execute function can be configured to execute the second software component 415 without executing the additional software component 428 in response to an instruction requesting execution of the second software component 415 according to a unique name assigned to the second software component 415.

Figure 5:
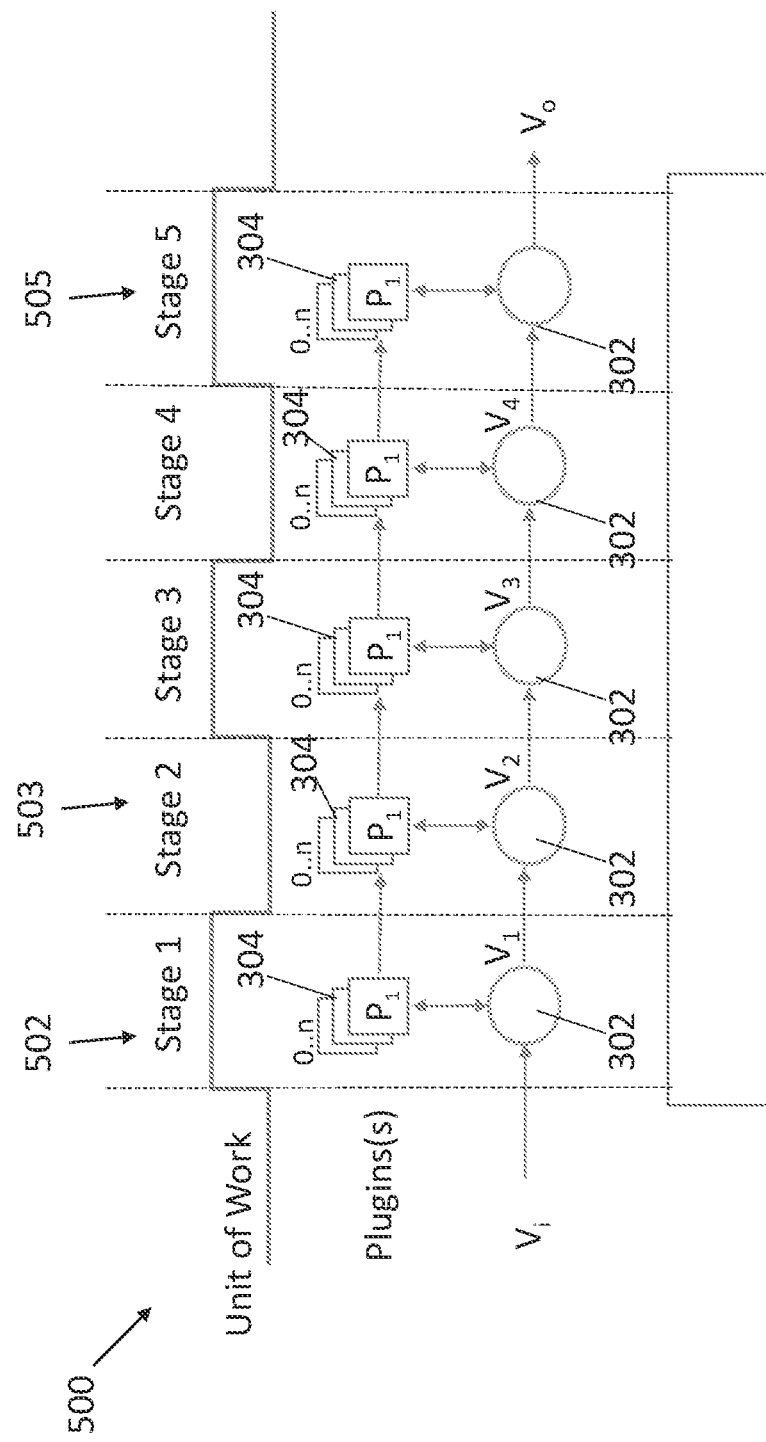
FIG. 5 illustrates a simplified schematic of a plurality of computational stages according to aspects of the present disclosure.

FIG. 5 illustrates a simplified schematic of a plurality of computational stages 500 according to aspects of the present disclosure. The system can be configured, during generation to determine a plurality of stream values, $V_n$, of each respective computational stage of the sequence of computational stages 500. The system input data describing the plurality of stream values, $V_n$, of the respective individual computational stage into a subsequent computational stage of the sequence of computational stages 500. For example, stream values from a first computational stage 502 can be mapped to respective stream inputs of the next adjacent computational stage 503, and so forth to a final computational stage 505. Such mapping can be implemented as a plugin characteristic.

In some embodiments, the one or more computational stages (e.g., a first stage 502 of the sequence of computational stages 500) can receive input values, $V_i$, that can be passed to the functional composition model as a whole. Another computational stage (e.g., the last computational stage 503 in the sequence of computational stages 500) can return output values, $V_o$, as an output of the functional composition model, as a whole.

In some embodiments, the system can be configured to ensure that the parent software component 304 (as a plug-in) co-propagates through the stages 400 in lock step with the input values, $V_n$, as they are transformed to output values, $V_{n+1}$, by each stage of the computational stages 500. At execution time, each computational stage 500 can receive, as inputs, the stream inputs $V_n$ and the co-propagated plugin, $P_n$. As the parent software component 304 (as a plug-in), $O_n$, can be treated as an additional stage input, each computational stage 500 in the sequence of computational stages 500 can be permitted to modify the parent software component 304 (as a plug-in), $P_n$, as necessary to complete the respective stage 400. Even when a stage 400 modifies the state of the parent software component 304 (as a plug-in), side-effects can be avoided as the functional composition model can ensure that each computational stage 400 runs with a respective copy of the parent software component 304 (as a plug-in).

This "pipeline construct" can separate business domain logic from orthogonal scaling complexities. Whereas techniques in the current arts tend to conflate or interleave these two concerns within the same source code, the pipeline construct described herein can provide separation of concerns and enable a generalized solution to complexities not previously generalizable. Thus, aspects of the disclosed technology provide benefits for orthogonal coding challenges associated with scaling and monitoring.

In some embodiments, the first software component 412 can include a sequence of computational stages 500, for example as described below with respect to FIG. 5A. The second software component 415 can be included within one stage of the sequence of stages 500. The transformation function of the component specification 404 for the first software component 412 can be configured, in the assembly phase 422, to schedule the sequence of stages 500 for execution in an order described by the transformation function of the first software component 412 when the component specification 404 is assembled. In the execute phase 430, the first software component 412 can be configured to ensure execution of the sequence of stages 500 as scheduled in the assembly phase 422 when the first software component 412 is executed.

Figure 6:
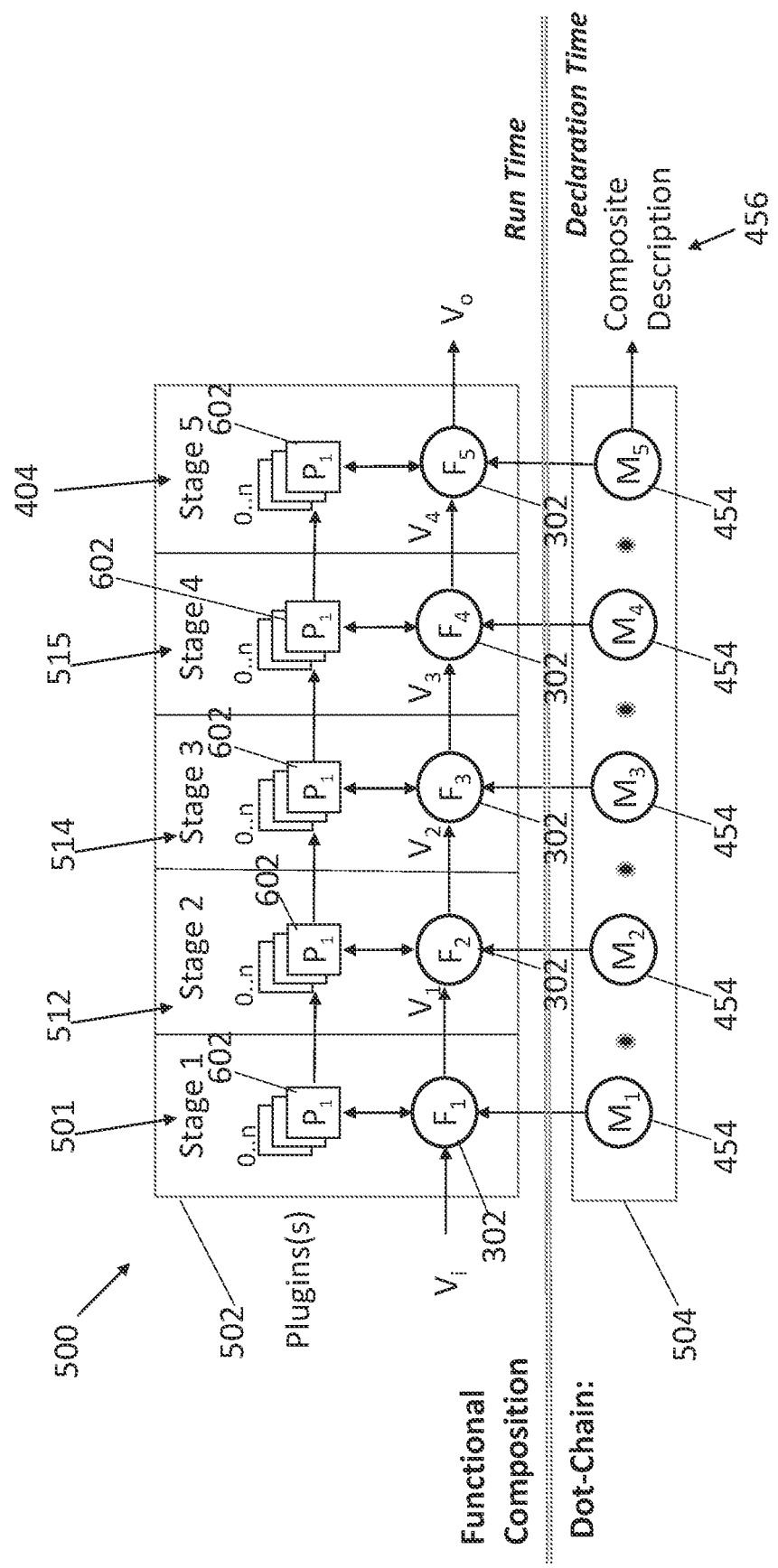
FIG. 6 is a simplified schematic illustration of the system of a plugin-oriented functional programming system according to aspects of the present disclosure.

FIG. 6 is a simplified schematic illustration of the system of a plugin-oriented monadic functional programming system 500. The system can include an application programming interface 504 and a plurality of computational stages 500.

In the design/edit phase 201 (FIG. 2A, the user can provide input 202 (FIG. 2A) that can be used to generate the component specification 204 that describes and/or defines a plurality of plug-in members 454, $M_n$.

In the define mode, the sequence of computational stages 500 can be input into the functional composition model 502, which can be configured to receive the sequence of computational stages 500 and, in response to receiving the sequence of computational stages, generate a function. The function can be configured to perform the same or similar operations as the plug-in members 454, $M_n$. The function can be described by the user input 202 and/or the plug-in members 454, $M_n$, defined by the user.

In some embodiments, the functional composition model 502 can be configured to complete processing a respective computational stage (e.g., the first stage 501) before beginning to process a subsequent computational stage (e.g., a second stage 512) that is after the respective computational stage (e.g., the first stage 501) when generating the function. Completing processing of the respective computational stage can include establishing a cadence governing operations of the respective computational stage, confirming that CPU threads of the respective computational stage are completed and have yielded all expected return values, and/or confirming that asynchronous operations of the respective computational stage are completed. In this example, the functional composition model 502 can be configured to complete processing the first stage before beginning processing the second stage 512. The system can be configured to complete processing the second stage 512 before beginning to process a third stage 514, and so forth. In some embodiments, the functional composition model may achieve this synchronizing cadence through the application of a Promise abstraction or a Continuation Monad to wrap each function and/or monad as the functional composition model invokes them.

Aspects of the present disclosure can provide for automatic troubleshooting and/or automatic repair functions during the declare mode. As one example, the computing system can determine (e.g., based on the plugin), that an exception has occurred with respect to a respective computational stage of the sequence of computational stages. In response to determining that the exception has occurred, the computing system can repair the respective computational stage.

As examples, a recourse pipeline may examine the failure and/or attempt to repair a cause of the failure (e.g., a root cause). Depending upon the remediation outcomes, the recourse pipeline may restart the software component, continue to a next step (e.g., next iteration, next computational stage, or the like), abort the current computational stage or iterations, and/or return to a parent software component of the current software component. Thus, the computing system can automatically troubleshoot and/or repair operations during generation of the function based on the sequence of computational stages.

FIG. 6 illustrates the bifurcated runtimes of the hybrid functional composition model of plugin-oriented functional programming. The plug-in members 454, $M_n$ can be dot-chained to compose the pipeline's API and produce the array of functions 602 and a composite description 456. The composite description 456 can be or include a meta-data description of a structure of the software system. The plug-in members 454, $M_n$, can be addressed by name within the pipeline's dot-chain API 504. The plugin members 454 can assemble their execution-time counterpart functions 302, which may access plugin state during the execution phase. Plugin state can be copied forward during the execution phase, as stages 501, 512, 514, 515, 404 are executed in series by the computing system.

Figure 7:
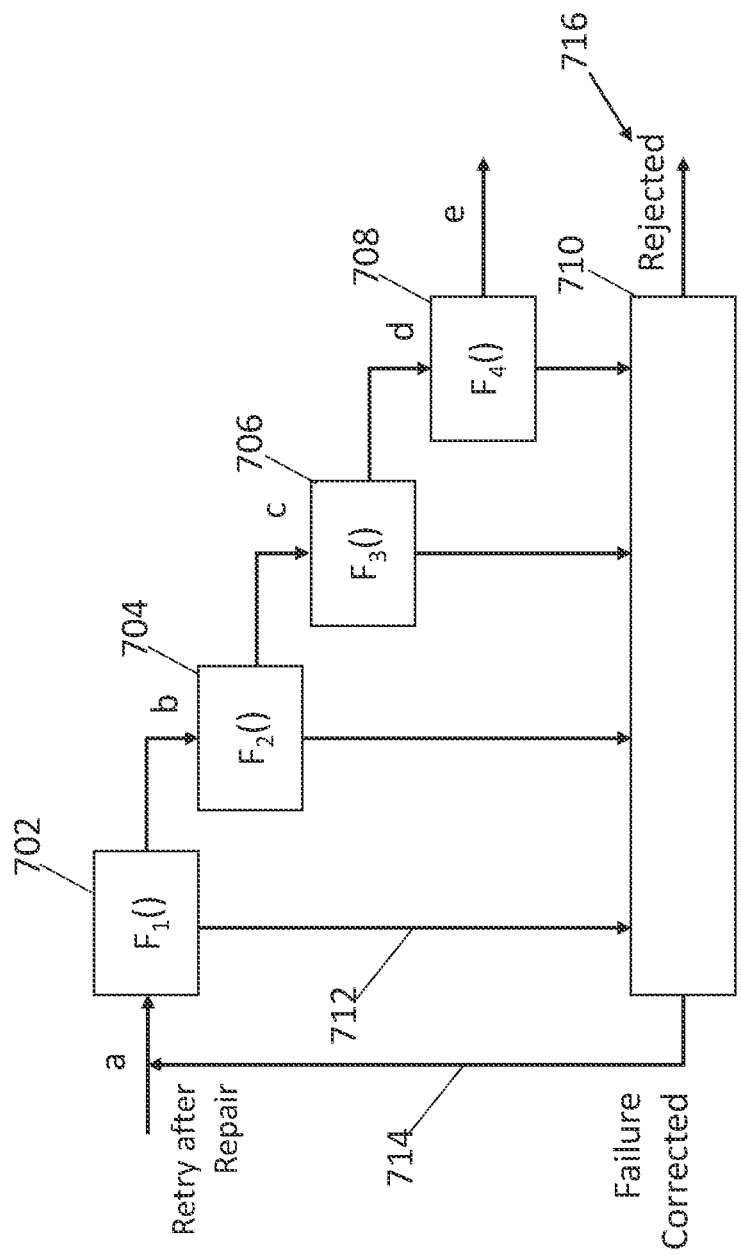
FIG. 7 is a simplified flowchart diagram of a recourse pipeline according to aspects of present disclosure.

FIG. 7 is a simplified flowchart diagram of a recourse pipeline according to aspects of present disclosure. Respective functions 702, 704, 706, 708 of each stage are illustrated. In some embodiments, in response to determining that an exception has occurred at a given stage, the computing system can input data describing the exception into a recourse pipeline 710 that is configured to receive the data describing the exception and generate data describing revisions to the respective computational stage to repair the respective computational stage. For instance, if an exception occurs in the first stage and/or first function 702, the system can input data 712 describing an exception of the first stage into the recourse pipeline 710. The recourse pipeline 710 can generate data 714 describing revisions to the first computational stage and/or first function 702. The system (e.g., functional composition model) can resume generation of the function (e.g., at the first function 702). However, if the recourse pipeline 710 does not or cannot generate the data 714 describing revisions to correct the errors causing the recourse (e.g., in the first function 702 and/or stage) then the recourse pipeline 710 may provide an output 716 indicating that the functional composition model has failed. In some embodiments, the recourse channel 710 can be described as and/or correspond with a specific type, manipulation, or implementation of a plugin, for example as described above with reference to FIGS. 3A through 5.

Error detection and/or remediation can be facilitated between different types of components and/or across various types of connections between components. For example, when an error is detected in a child component in a child-parent relationship with a parent component, the child can modify itself and/or the parent component to fix the error. For instance, referring again to the example described above with reference to FIGS. 4A and 4B, the third software component 424 can be defined as a parent of the first software component 412, the component specification of the third software component 424 can include data describing a sequence of stages. In the assembly phase 422, the factory function 416 can be configured to embed the first software component 412 within the third software component 424 according to the component specification of the first software component 412. In the execute phase 430 after the assembly phase 422, the execute function 432 can be configured to execute the third software component 424 and detect an error condition during the execution of the third software component 424. For example, the error condition can be or include a mismatch between expected inputs and received inputs (e.g., conflicting data types, input sources, input names, etc.).

In response to detecting the error condition during execution of the third software component 424, data describing the error condition can be input into the first software component 412. The first software component 412 can be configured to receive the data describing the error condition and, in response to receiving the data describing the error condition, modify at last one of the first software component 412 or the third software component 424, and output an error remediation status. The error remediation status can describe whether the modifications to the first software component 412 and/or the third software component 424 were successful at correcting the error.

In the execute phase 430, the execute function 432 can be configured to determine that the error remediation status satisfies one or more criteria. For example, the criteria can describe or define fatal error types and non-fatal error types, require fewer than a maximum number of non-fatal error types, require no fatal error types, combinations thereof, and the like. The error remediation status satisfying the criteria can indicate that the modifications to the first software component 412 and/or the third software component 424 successful corrected the error. In response to determining that the error remediation status satisfies the criteria, the execute function 432 can resume execution of the third software component 424, the parent. Alternatively, in response to determining that the error remediation status fails to satisfy the criteria, the execute function 432 can halt the execution of the third software component 424. In some embodiments, the execute function 432 can repeat the above steps for multiple attempts at error remediation.

In other words, in response to determining that an exception has occurred at a given stage, the computing system can input data describing the exception into a recourse pipeline 710 that is configured to receive the data describing the exception and diagnose and attempt to repair the underlying condition that caused the respective stage to throw the exception. For instance, if an exception occurs in the first stage and/or first function 702, the system can input data 712 describing an exception arising the first stage into the recourse pipeline 710. The recourse pipeline 710 can inspect the description of the failure and determine if a repair or some form of remediation is feasible. If the recourse pipeline identifies the error condition and is able to successfully repair or remediate the underlying condition, the recourse 710 takes the failure correct branch 714, wherein the sequence of functions is retried with the original inputs. If the failure was unknown or unrepairable, the recourse 710 takes the rejected branch 716, wherein the computing system escalates the error to a parent software component, where greater scope may allow for a broader range of remediation options.

In some embodiments, the recourse 710 can be described as and/or correspond with a specific type, manipulation, or implementation of a plugin, for example as described above with reference to FIG. 3B. The recourse 710 may also allow for multiple remediation strategies to be tried, testing each remediation attempt by retrying the failed function 702 and resuming the recourse with the next remediation strategy in the event that the exception recurs.

Figure 8:
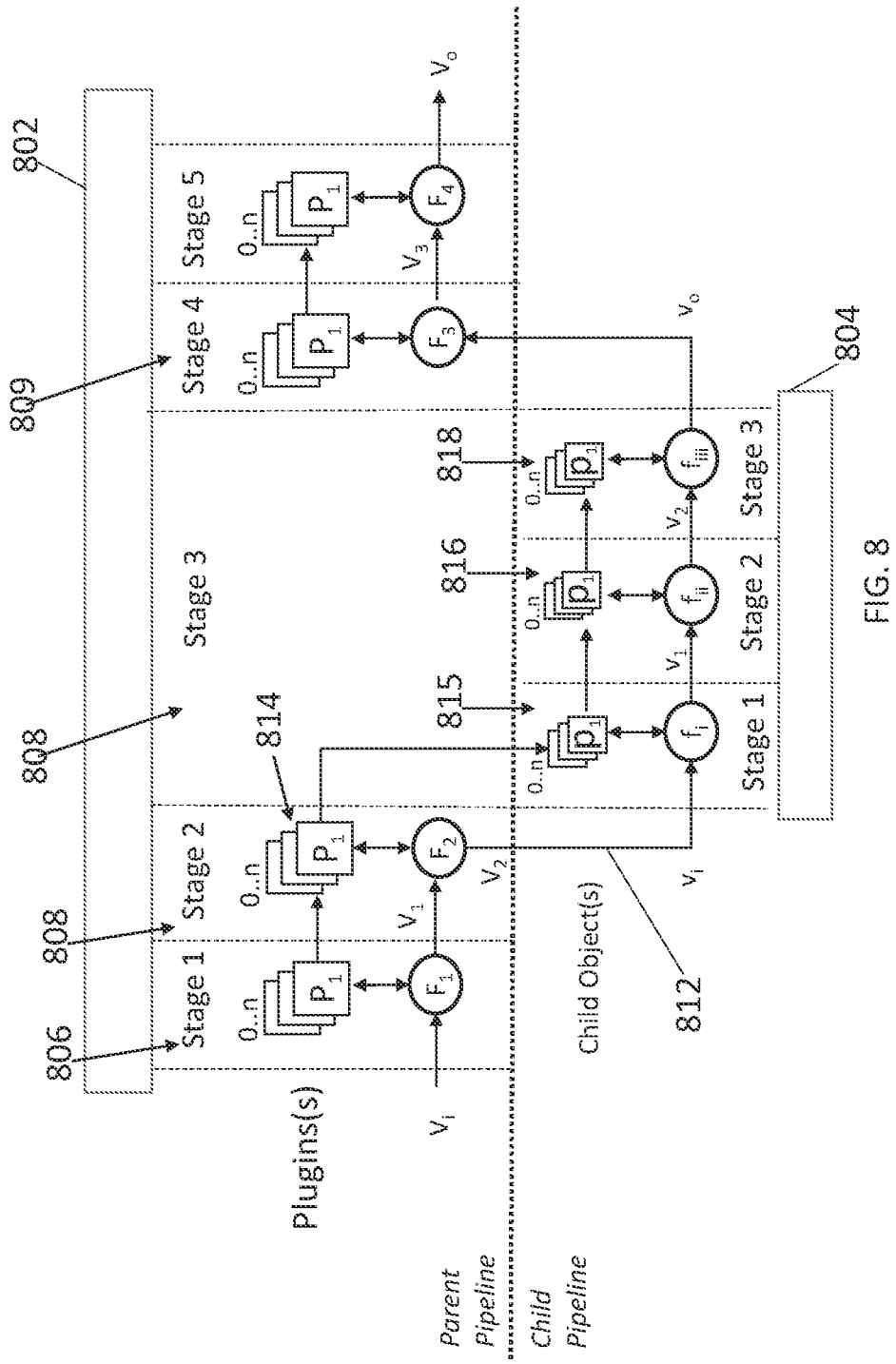
FIG. 8 is a simplified illustration of an example parent pipeline and a child pipeline according to aspects of present disclosure.

FIG. 8 is a simplified illustration of an example parent pipeline 802 and a child pipeline 804. The computing system can coordinate execution and value passing across levels of hierarchy. The parent pipeline 802 can comprise a sequence of stages 806, 808 and the third stage 808 can include a child pipeline 804. The child pipeline 804 can include a sequence of stages 815, 816, 818. The system can execute the child pipeline 804 as the third stage 808 of the parent pipeline 802. Thus, in this example, the system can execute the child pipeline 804 after the second stage 808 of the parent pipeline 802 has been completed, and before a fourth stage 809 of the parent pipeline 802 is started. In some embodiments, the system is required to execute the child pipeline 804 as described above Each of the parent stages 806, 808 can be flanked by a synchronizing enclosure which ensures any asynchronous 10 and/or threads initiated by a stage are completed before the stage yields to the next stage in the sequence of stages. This synchronizing enclosure prevents the parent pipeline 802 from progressing to the fourth stage 509, without first receiving required outputs $v_o$ from the child pipeline 804.

The parent pipeline 802 can pass input values 812 to the child pipeline 804. In some embodiments of the present disclosure, the set of plugins 814 available within the parent pipeline 802 may also be passed into the child pipeline 804, to allow the child pipeline 804 to inherit plugins from their parent pipelines 802.

The computing system can coordinate execution and value passing across levels of hierarchy. In some embodiments, one or more child software components or child pipelines (represented by the child execution channel 804 in FIG. 8) can be nested inside a parent software component or pipeline (represented by the parent execution channel 802 in FIG. 8). For example, in some embodiments, at least one computational stage of the sequence of computational stages can include a child application programming interface configured to generate a child sequence of computational stages (represented by the child execution channel 804) and a child functional composition model configured to receive the nested sequence of computational stages and, in response to receiving the sequence of computational stages, generate a child function.

The flow of stream values where the child software component branches from the parent can illuminate unrecoverable failures from the child software component to parent software component for higher-scope remediation, etc. The computing system can detect when data describing the parent software component is passed as an argument to the child software component to achieve this linkage between a declaration-time specification of hierarchy and a runtime implementation of the hierarchy. Such passing of data describing the parent software component to the child software component can be recognized at runtime as a kind of declarative handshake, or "baton-passing." This passing of data describing the parent software component can signal to the functional composition model that necessary stream values and/or key/value pairs should be shared by copying from parent to child pipelines/software components. Additionally, in some embodiments, the child software component can include another nested software component, and so forth, such that nesting can be achieved to greater depth. Thus, aspects of the present disclosure are directed to nesting of software components.

As one example, at declaration time, data describing a parent software component (e.g., stream values and/or plugins) can be passed as an argument to a child software component. The need to copy state information from parent software component to the child software component during the declare mode can be identified and/or registered in define mode. During declare mode, the parent software component can create the child software component. The parent software component can make these state transcriptions before the child software component is executed. During the declare mode, the parent software component can suspend its own execution and invoke the child software component. Once execution of the child software component is complete, execution of the parent software component can be resumed. An output from the child software component can be passed as an input to a next computational stage of the parent software component.

For example, referring to FIG. 8, the parent execution channel 802 can include a first stage 806 and a second stage 808. The first stage 806 can function as described above with respect to FIGS. 2 through 4. The child execution channel 804 can include a first stage 810 configure to receive data describing stream values 812 and/or a plugin 814 from the second stage 808 of the parent execution channel 802. The child execution channel 804 can include one or more additional stages, such as a second stage 816 and a third stage 818. The child execution channel 804 can function as described above with respect to FIGS. 2 through 4. The child execution channel 804 can correspond with a third stage 820 of the parent execution channel 802.

Aspects of the present disclosure can include facilitating invoking of services and/or utilities during the design mode and/or declare mode. For example, a state machine can be configured to define, inspect, or transition between states of the sequence of computational stages (e.g., in response to detecting a user input). As another example, a services-andsources broker can be configured to invoke a service (e.g., a local service, a remote service, etc.) and/or store outputs of the sequence of computational stages. As one example, a third-party plug-in can communicate with a cloud service or the like.

Figure 9:
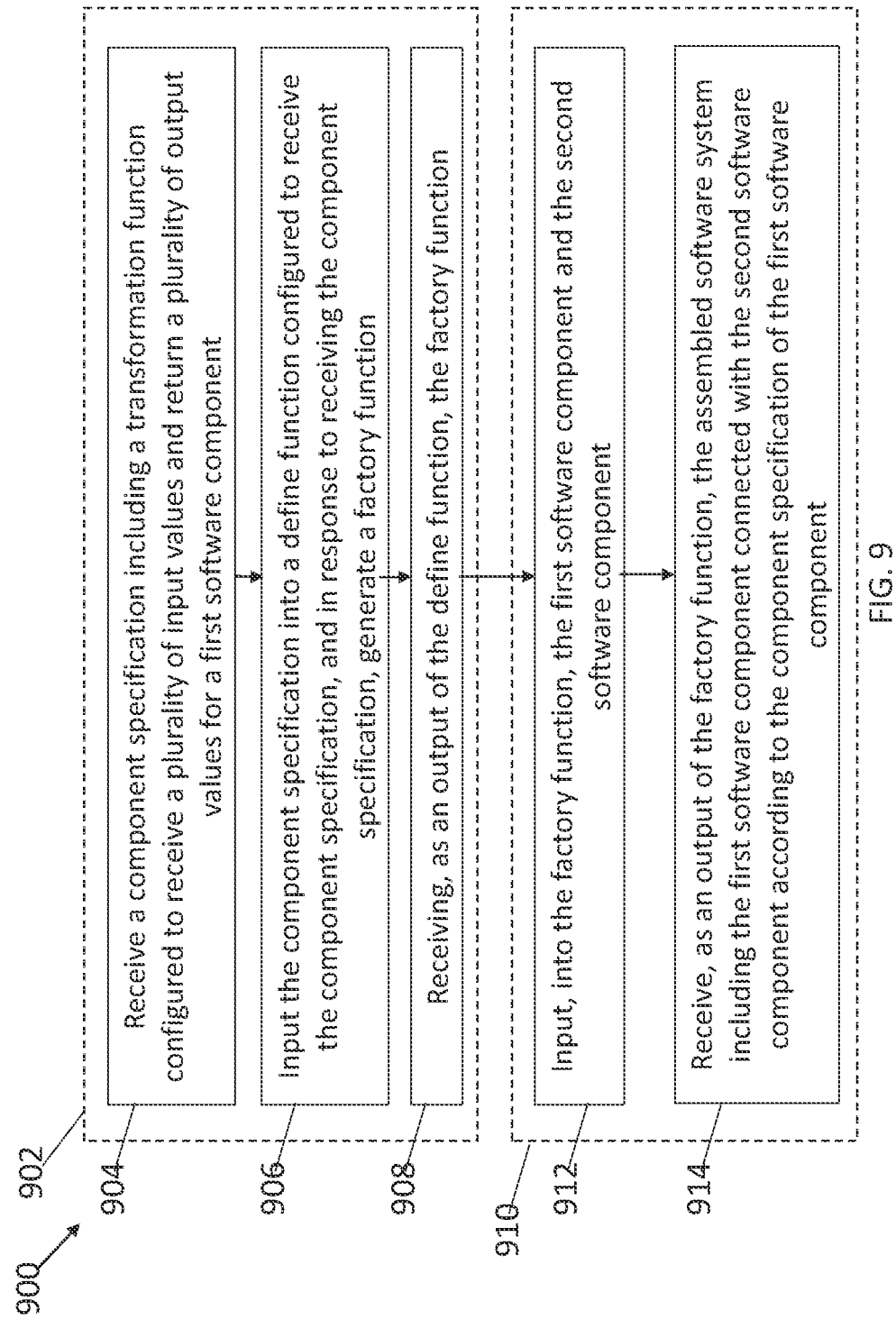
FIG. 9 illustrates a flowchart diagram of an example method for plugin-oriented functional programming according to aspects of the present disclosure.

FIG. 9 illustrates a flowchart diagram of an example method 900 according to aspects of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

The method 900 may include performing a plurality of operations in a define phase 902. For example, the method 900 can include, in the define phase 902, at (904), receiving a component specification comprising a transformation function configured to receive a plurality of input values and return a plurality of output values for a first software component. For example, a user (e.g., citizen programmer) can provide design inputs describing the first software component. The design inputs can describe operations that the user would like for the first software component (e.g., transformation function) to perform once assembled into a software system. For example, the user (e.g., citizen programmer) can provide the design inputs using a graphical user interface. The graphical user interface can allow the user to connect software components by selecting, dragging, and dropping various types of software components and/or connection therebetween.

The method 900 can include, in the define phase 902, at (906), inputting the component specification into a define function configured to receive the component specification, and in response to receiving the component specification, generate a factory function, for example as described above with respect to FIGS. 4A and 4B.

The method 900 can include, in the define phase 902, at (908), receiving the factory function as an output of the define function, for example as described above with respect to FIGS. 4A and 4B. The factory function can be configured to receive data describing a second software component that satisfies the component specification of the first software component, and in response to receiving the data describing the first software component and the second software component, output an assembled software system including the first software component connected with the second software component according to the component specification. In some embodiments, the second software component can similarly be designed by the user (e.g., citizen programmer) using the graphical user interface as described above with respect to the first software component.

The method 900 can include, in an assembly phase 910 after the define phase 902, at (912), inputting the first software component and the second software component into the factory function, for example as described above with respect to FIGS. 4A and 4B.

The method 900 can include, in the assembly phase 910, at (914), receiving, as an output of the factory function, the assembled software system including the first software component connected with the second software component according to the component specification of the first software component, for example as described above with respect to FIGS. 4A and 4B.

Additional Disclosure

The example source code below illustrates an example of one embodiment of a component specification for a pipeline, containing a description, inputs, outputs, registers, plugins, a sequence of stages and a recourse pipeline. Note, the example is expressed in Typescript.

```
Pipeline.define({
    description: "Find matching files on S3, rename, queue for
    processing",
    inputs: {
        prefix: Pipeline.input<string>(1, "", "Path to search"),
        regex: Pipeline.input<RegExp>(2, "", "Regex to match") },
    outputs: {
        queuedFiles: Pipeline.output<Array<string>>(1, [ ], "Queued
        files") },
    registers: {
        matchingFiles: Pipeline.register<Array<string>>([ ], "Matching
        files")}
},
(self) => self
    .plugin(AsyncOps)("async")
    .plugin(S3, bucket)("s3")
    .s3.listFiles(self.input("prefix"))
    .async.filterSeries(self.input("regex"),
        (regex, file) => regex.test(file.Key))
    .save(self.register("matchingFiles"))
    .plugin(GraylogLogger, "job-queuer")("log")
    .async.items(self.register("matchingFiles")).forEach(queueFile)
    .onError((err) => err
        .if(err.like(/bucket.*not exist/))
            .s3.createBucket( )
            .restart( )
        .elif(self.register("matchingFiles"), (files) => files.length==0)
            .log.info("No files available for queuing.")
            .resolve( )
        .elif(err.like(/network unavailable/) || err.like(/timeout/))
            .sleep( )
            .restart( )
        .else( )
            .reject( )
        ._if( )
    )
);
```

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:
1. A computing system comprising:
at least one processor;

at least one tangible, non-transitory computer-readable medium that stores instructions that, when executed by the at least one processor, cause the at least one processor to perform operations, the operations comprising:

in a define phase:
  receiving a component specification comprising a transformation function configured to receive a plurality of input values and return a plurality of output values for a first software component;
  inputting the component specification into a define function configured to receive the component specification, and in response to receiving the component specification, generate a factory function;
  receiving, as an output of the define function, the factory function, wherein the factory function is configured to:
    receive data describing a second software component that satisfies the component specification of the first software component; and
    in response to receiving the data describing the first software component and the second software component, output an assembled software system comprising the first software component connected with the second software component according to the component specification; and in an assembly phase after the define phase:
  inputting, into the factory function, the first software component and the second software component; and
  receiving, as an output of the factory function:
    the assembled software system comprising the first software component connected with the second software component by a connection according to the component specification of the first software component, wherein the assembled software system received as an output of the factory function comprises an execute function that is configured to perform, in an execute phase after the assembly phase, operations comprising:
      receiving the plurality of input values;
      processing the plurality of input values according to the transformation function of the first software component; and
      after computational activities associated with execution of the first software component are completed, receiving, as an output of the first software component, the plurality of output values.

2. The computing system of claim 1, wherein the assembled software system received as an output of the factory function comprises:
  data describing the first software component;
  data describing the second software component; and
  data describing the connection that connects the first software component with the second software component.

3. The computing system of claim 1, wherein the connection between the first software component and the second software component comprises a series-type connection, wherein the first software component is connected in series with the second software component, and wherein the operations further comprise:
  in the define phase:
    defining a third software component as a parent to both the first software component and the second software component, wherein the third software component comprises a component specification comprising data describing an embedding each of the first software component and the second software component within the third software component, and wherein the component specification of the third software component comprises data describing a relative connection order of the first software component and the second software component;
  in the assembly phase:
    mapping a plurality of output values received from the second software component to the plurality of input values expected by the first software component according to the component specification of the third software component.

4. The computing system of claim 1, wherein the component specification of the first software component describes a parent-child-type connection with the second software component, wherein the first software component is configured to embed the second software component as a child within the first software component, and wherein:
  in the define phase, the define function is configured to map at least one input requirement of the component specification of the first software component to the component specification of the second software component;
  in the assembly phase, the factory function is configured to assemble the second software component during assembly of the first software component.

5. The computing system of claim 1, wherein the component specification of the first software component describes a namespace-member type connection with the second software component such that the first software component is configured to embed the second software component, and wherein the component specification of the first software component describes a namespace, and wherein in the assembly phase, the factory function is configured to:
  assemble the second software component when assembling the first software component;
  embed the second software component within the first software component; and
  assign the second software component a unique name identifying the second software component within the namespace described by the component specification of the first software component.

6. The computing system of claim 5, wherein an additional software component is embedded within the first software component in addition to the second software component, and in an execute phase after the assembly phase, and wherein an execute function is configured to execute the second software component without executing the additional software component in response to an instruction requesting execution of the second software component according to the unique name assigned to the second software component.

7. The computing system of claim 5, wherein the operations further comprise:
  in the define phase, the first software component defines a unique variable name, wherein the unique variable name is unique within the namespace of the first software component, and wherein access to a variable associated with the unique variable name is shared between the first software component and the second software component;
  in an execute phase after the assembly phase, the first software component stores a value associated with the unique variable name; and
  in the execute phase, the second software component at least one of updates the value associated with the unique variable name or performs an operation with the value associated with the unique variable name.

8. The computing system of claim 5, wherein the operations further comprise:
in the define phase, defining a third software component as a parent of the first software component, wherein the third software component comprises a component specification describes a transformation function configured to receive:
data describing a sequence of stages embedded within the third software component;
data describing an embedding of the first software component as one stage within the sequence of stages;
data describing an embedding of the second software component as one stage within a sequence of stages, wherein the data describing the embedding of the second software component describes the unique name identifying the second software component within the namespace of the first software component;
data describing a relative connection order within the sequence of stages of the first software component and the second software component within the sequence of stages; and
wherein the operations further comprise, in the assembly phase using the factory function, embed the first software component and second software component in the relative connection order.

9. The computing system of claim 1, wherein the first software component comprises a sequence of stages, and wherein the second software component is included as one stage of the sequence of stages.

10. The computing system of claim 9, wherein the transformation function of the component specification for the first software component is configured to:
in the assembly phase, schedule the sequence of stages for execution in an execution order described by the transformation function of the first software component; and
in an execute phase, execute the sequence of stages according to the execution order.

11. The computing system of claim 10, wherein executing the sequence of stages according to the execution order comprises completing execution of a respective computational stage of the sequence of stages before beginning to execute a subsequent computational stage of the sequence of stages that is after the respective computational stage in the sequence of stages.

12. The computing system of claim 1, wherein the operations further comprise:
in the define phase, defining a third software component as a parent of the first software component, wherein a component specification of the first software component comprises data describing a sequence of stages, and wherein:
in the assembly phase using the factory function, embedding the first software component within the third software component according to the component specification of the first software component; and
in an execute phase after the assembly phase:
execute the third software component;
detect an error condition during the execution of the third software component;
in response to detecting the error condition during execution of the third software component, inputting data describing the error condition into the first software component, wherein the first software component is configured to receive the data describing the error condition and, in response to receiving the data describing the error condition, modify at last one of the first software component or the third software component, and output an error remediation status; and
receive, from the first software component, the error remediation status.

13. The computing system of claim 12, wherein in the execute phase, the execute function is configured to:
determine that the error remediation status satisfies one or more criteria;
in response to determining that the error remediation status satisfies the one or more criteria, resume execution of the third software component.

14. The computing system of claim 13, wherein in the execute phase, the execute function is configured to:
determine that the error remediation fails to status satisfy one or more criteria;
in response to determining that the error remediation status fails to satisfy the one or more criteria, halting the execution of the third software component.

15. The computing system of claim 1, wherein the component specification of the first software component comprises data describing a register, and wherein the operations further comprise:
in an assembly phase receiving data describing the register identified by a unique name that satisfies the component specification of the first software component, and wherein the assembled software system that is received as an output of the factory function comprises the register connected with the second software component.

16. The computing system of claim 15, wherein the assembled software system received as an output of the factory function comprises:
data describing the first software component;
data describing the register;
data describing the second software component; and
data describing the connection between the second software component and the register.

17. The computing system of claim 15, wherein the operations further comprise searching a named value space of the first software component to resolve a value descriptor to a value.

18. The computing system of claim 15, wherein the operations further comprise, in the define phase, defining a third software component as a parent of the first software component, and wherein searching a named value space of the first software component to resolve a value descriptor to the value comprises searching a named value space of the third software component.

19. The computing system of claim 15, wherein the register is configured to store and retrieve values within one of:
main memory;
file stored locally on disk;
table stored within a database; and
remote repository requiring asynchronous access over a network.

20. The computing system of claim 1, wherein the first software component comprises a sequence of stages, wherein the operations further comprise executing the first software component in an execute phase, and wherein executing the first software component in an execute phase, comprises:

executing a first stage of the sequence of stages of the first software component;
creating a copy of the first software component including the sequence of stages; and
executing a second stage of the sequence of stages of the copy of the first software component.

21. The computing system of claim 20, wherein the connection between the first software component and the second software component comprises a reference from the first software component to the second software component, and wherein the operations further comprise modifying the reference when the first software component is copied, such that the copy of the first software component is connected to a copy of the second software component.

22. The computing system of claim 1, wherein the component specification of the first software component includes input requirements, wherein the input requirements comprise:
   restrictions on types of input values that can be received by the first software component and types of output values returned by the first software component; and
   restrictions on at least one of an expected number or an order of the input values.

23. The computing system of claim 22, wherein the operations further comprise ensuring connections to inputs to the first software component meet the restrictions on the types of input values of the input requirements of the component specification of the first software component.

24. The computing system of claim 1, wherein the operations further comprise providing for display a graphical depiction of the assembled software system, wherein the graphical depiction comprises the first software component, the second software component, and a connection between the first and second software component as a diagram of connected elements presented by a user interface device.

25. The computing system of claim 1, wherein the operations further comprise:
   in an editing phase before the define phase,
      receiving, by one or more computing devices, data describing a user input;
      inputting the data describing the user input into an application programming interface configured to receive the data describing the user input, and in response to receiving the user input, generate a sequence of computational stages, wherein an order of the sequence of computational stages is described by the user input;
      receiving, as an output of the application programming interface, the sequence of computational stages; and
      inputting the data describing the user input and the sequence of computational stages into a source code generation model configured to receive the data describing the user input and the sequence of computational stages and, in response to receiving the data describing the user input and the sequence of computational stages, generate the component specification of the first software component.

26. The computing system of claim 25, wherein the operations further comprise providing for display at least one of:
   a rendering of the component specification of the first software component as human-readable source code describing the first software component; or
   a rendering of the transformation function of the first software component as human-readable source code.

27. A computer implemented method comprising:
   in a define phase:
      receiving, by one or more computing devices, a component specification comprising a transformation function configured to receive a plurality of input values and return a plurality of output values for a first software component;
      inputting, by the one or more computing devices, the component specification into a define function configured to receive the component specification, and in response to receiving the component specification, generate a factory function;
      receiving, by the one or more computing devices as an output of the define function, the factory function, wherein the factory function is configured to:
         receive data describing a second software component that satisfies the component specification of the first software component; and
         in response to receiving the data describing the first software component and the second software component, output an assembled software system comprising the first software component connected with the second software component according to the component specification; and
   in an assembly phase after the define phase:
      inputting, by the one or more computing devices into the factory function, the first software component and the second software component; and
      receiving, by the one or more computing devices as an output of the factory function:
         the assembled software system comprising the first software component connected with the second software component by a connection according to the component specification of the first software component, wherein the assembled software system received as an output of the factory function comprises an execute function that is configured to perform, in an execute phase after the assembly phase, operations comprising:
            receiving the plurality of input values;
            processing the plurality of input values according to the transformation function of the first software component; and
            after computational activities associated with execution of the first software component are completed, receiving, as an output of the first software component, the plurality of output values.

28. At least one tangible, non-transitory computer-readable medium that stores instructions that, when executed by at least one processor, cause the at least one processor to perform operations comprising:
   in a define phase:
      receiving a component specification comprising a transformation function configured to receive a plurality of input values and return a plurality of output values for a first software component;
      inputting the component specification into a define function configured to receive the component specification, and in response to receiving the component specification, generate a factory function;
      receiving, as an output of the define function, the factory function, wherein the factory function is configured to:
         receive data describing a second software component that satisfies the component specification of the first software component; and
         in response to receiving the data describing the first software component and the second software component, output an assembled software system comprising the first software component connected with the second software component according to the component specification; and in an assembly phase after the define phase:
  inputting, into the factory function, the first software component and the second software component; and
  receiving, as an output of the factory function:
    the assembled software system comprising the first software component connected with the second software component by a connection according to the component specification of the first software component, wherein the assembled software system received as an output of the factory function comprises an execute function that is configured to perform, in an execute phase after the assembly phase, operations comprising:
      receiving the plurality of input values;
      processing the plurality of input values according to the transformation function of the first software component; and
    after computational activities associated with execution of the first software component are completed, receiving, as an output of the first software component, the plurality of output values.

* * * * *